(12) United States Patent
Bhatnagar et al.

(10) Patent No.: US 11,848,821 B2
(45) Date of Patent: Dec. 19, 2023

(54) METHODS AND APPARATUS TO DETERMINE CONTAINER PRIORITIES IN VIRTUALIZED COMPUTING ENVIRONMENTS

(71) Applicant: VMWARE, INC., Palo Alto, CA (US)

(72) Inventors: Yash Bhatnagar, Bangalore (IN); Hemani Katyal, Bangalore (IN); Chandrashekhar Jha, Bangalore (IN); Mageshwaran Rajendran, Bangalore (IN); Ritesh Jha, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 18/160,464

(22) Filed: Jan. 27, 2023

(65) Prior Publication Data

US 2023/0179485 A1     Jun. 8, 2023

Related U.S. Application Data

(63) Continuation of application No. 17/332,771, filed on May 27, 2021, now Pat. No. 11,575,576, which is a (Continued)

(30) Foreign Application Priority Data

Dec. 18, 2019     (IN) ............................. 201941052634

(51) Int. Cl.
*H04L 41/0893*     (2022.01)
*G06F 9/50*         (2006.01)
*G06F 11/34*        (2006.01)

(52) U.S. Cl.
CPC ........ *H04L 41/0893* (2013.01); *G06F 9/5038* (2013.01); *G06F 9/5077* (2013.01); *G06F 9/5083* (2013.01); *G06F 11/34* (2013.01)

(58) Field of Classification Search
None
See application file for complete search history.

(56) References Cited

U.S. PATENT DOCUMENTS 9,858,123 B1     1/2018  Dailianas et al.
9,888,067 B1     2/2018  Yemini et al.
(Continued)

OTHER PUBLICATIONS

Kubernetes, "Production-Grade Container Orchestration," retrieved from https://kubernetes.io/, on Oct. 29, 2019, (4 pages).
(Continued)

*Primary Examiner* — Jeffrey R Swearingen
(74) *Attorney, Agent, or Firm* — Hanley, Flight & Zimmerman, LLC

(57) ABSTRACT

An example system includes memory, programmable circuitry, and machine readable instructions to program the programmable circuitry to: obtain utilization metric information corresponding to utilization metrics collected over a time interval, the utilization metrics corresponding to allocated resources utilized by containers, the containers associated with a cluster, obtain a request to generate priority classes for the containers in the cluster, the priority classes indicative of which containers have a greater priority in the cluster, and generate the priority classes for the containers based on the utilization metric information and a count of network interactions corresponding to the containers for the time interval.

20 Claims, 9 Drawing Sheets

Related U.S. Application Data continuation of application No. 16/802,591, filed on Feb. 27, 2020, now Pat. No. 11,025,495.

(56) References Cited

U.S. PATENT DOCUMENTS

| | | | |
|---|---|---|---|
| 11,126,461 B2* | 9/2021 | Doudali | G06F 9/5061 |
| 11,323,327 B1* | 5/2022 | Chitalia | H04L 41/0893 |
| 11,392,422 B1* | 7/2022 | Filiz | G06F 9/45558 |
| 2020/0034166 A1 | 1/2020 | Wang et al. | |
| 2020/0151018 A1 | 5/2020 | Jha et al. | |
| 2020/0192692 A1 | 6/2020 | Ghag et al. | |
| 2020/0210226 A1 | 7/2020 | Dasari et al. | |

OTHER PUBLICATIONS

Edureka, "Understanding K-means Clustering with Examples," Jun. 23, 2019, can be retrieved from https://www.edureka.co/blog/k-means-clustering/ (8 pages).

Datanovia, "Determining The Optimal Number of Clusters: 3 Must Know Methods," can be retrieved from https://www.datanovia.com/en/lessons/determining-the-optimal-number-of-clusters-3-mustknow-methods/, Jun. 23, 2019, (9 pages).

Kubernetes, "Pod Priority and Preemption," can be retrieved from https://kubernetes.io/docs/conceptsconfiguration/pod-priority-preemption/, Jul. 24, 2020, (11 pages).

Hasham Haider, "Everything you Need to Know about Kubernetes Quality of Service (QoS) Classes," Mar. 22, 2019, can be retrieved from https://www.replex.io/blog/everything-you-need-to-know-about-kubernetes-quality-ofserviceqos-classes, (11 pages).

Nilesh Suryavanshi, "What are Quality of Service (QoS) Classes in Kubernetes," May 16, 2017, can be retrieved from https://medium.com/google-cloud/quality-of-service-class-qos-in-kubernetes-bb76a89eb2c6, (5 pages).

Tomasz Cholewa, "Treat your pods according to their needs—three QoS classes in Kubernetes," Mar. 12, 2018, can be retrieved from https://cloudowski.com/articles/three-qos-classes-in-kubernetes/, (4 pages).

Pazdziora et al., "The Kubernetes Resource Model," Nov. 16, 2017, can be retrieved from https://github.com/kubernetes/community/blob/master/contributors/designproposals/scheduling/resources.md#future-resource-types, (10 pages).

Grafana Labs, "Grafana App for Kubernetes," 2018, retrieved Nov. 2, 2021 from https://grafana.com/plugins/grafana-kubernetes-app, (3 pages).

United States Patent and Trademark Office, "Notice of Allowance and Fee(s) Due", in connection with U.S. Appl. No. 16/802,591, dated Jan. 26, 2021, 7 pages.

Li et al. "Anomaly Detection for Container Cluster based on JointCloud Platform. ICCDA 2019: Proceedings of the 20, 19 3rd International Conference on Compute and Data Analysis." Mar. 2019. 5 pages.

Takahashi et al. "A Portable Load Balancer for Kubernetes Cluster." HPC Asia 2018: Proceedings of the International Conference on High Performance Computing in Asia-Pacific Region. Jan. 2018. pp. 222-231, 10 pages.

Syed et al. "The Container Manager Pattern." EuroPLoP '17: Proceedings of the 22nd European Conference on Pattern Languages of Programs. Jul. 2017. Article No. 28, 9 pages.

United States Patent and Trademark Office, "Notice of Allowance and Fee(s) Due," in connection with U.S. Appl. No. 17/332,771, dated Oct. 4, 2022, 8 pages.

\* cited by examiner

| METRIC | POD A | POD B | POD C |
|---|---|---|---|
| CPU | 2 | 1 | 3 |
| MEMORY | 16 GB | 4 GB | 6 GB |
| NETWORK IOPS | 150 OPS/S | 10 OPS/S | N/A |
| NETWORK B/W | 4 MB/S | 6 MB/S | N/A |
| STORAGE | 40 GB | 10GB | 10 GB |
| DISK TIME | 30 MS | N/A | 180 MS |
| STORAGE IOPS | 15 OPS/S | N/A | N/A |
| HADOOP SLOTS | 2 | N/A | N/A |

TABLE 1 – ALLOCATED RESOURCES

| METRIC | $T_N$ | $T_{N-1}$ | $T_{N-3}$ | $T_{N-4}$ |
|---|---|---|---|---|
| CPU | 1.332 | 1.233 | 1.178 | 1.155 |
| MEMORY | 2.44 GB | 2.44 GB | 2.10 GB | 2.22 GB |
| NETWORK IOPS | 44 OPS/S | 30 OPS/S | 10 OPS/S | 12 OPS/S |
| NETWORK B/W | 850 KB/S | 1.12 MB/S | 1.24 MB/S | 980 KB/S |
| DISK TIME | 10 MS | 10 MS | 10 MS | 9 MS |

TABLE 2 – UTILIZATION METRICS

| NETWORK SOURCE | NETWORK DESTINATION | INTERACTION COUNT |
|---|---|---|
| POD A | POD B | 35 |
| POD C | POD B | 140 |
| POD B | POD D | 3 |

TABLE 3 – NETWORK INTERACTION METRICS

FIG. 2

METHODS AND APPARATUS TO DETERMINE CONTAINER PRIORITIES IN VIRTUALIZED COMPUTING ENVIRONMENTS

RELATED APPLICATIONS

This patent arises from a continuation of U.S. patent application Ser. No. 17/332,771, (Now U.S. Pat. No. 11,575, 576) which was filed on May 27, 2021, which is a continuation of U.S. patent application Ser. No. 16/802,591, which was filed on Feb. 27, 2020, (now U.S. Pat. No. 11,025,495) which claims benefit under 35 U.S.C. 119(a)-(d) to Indian Application Serial No. 201941052634 filed in India entitled "METHODS AND APPARATUS TO DETERMINE CONTAINER PRIORITIES IN VIRTUALIZED COMPUTING ENVIRONMENTS", on Dec. 18, 2019, by VMware, Inc. U.S. patent application Ser. No. 17/332,771, U.S. patent application Ser. No. 16/802,591, and Indian Application Serial No. 201941052634 are hereby incorporated herein by reference in their entireties. Priority to U.S. patent application Ser. No. 17/332,771, U.S. patent application Ser. No. 16/802,591, and Indian Application Serial No. 201941052634 is hereby claimed.

FIELD OF THE DISCLOSURE

This disclosure relates generally to virtualized computing, and, more particularly, to determining container priorities in virtualized computing environments.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

BRIEF DESCRIPTION OF THE DRAWINGS

FIG. 2 illustrates example data tables stored in an example database of FIG. 1 to represent allocated resources, utilization metrics, and network interaction metrics of the example containers of FIG. 1.

Figure 1:
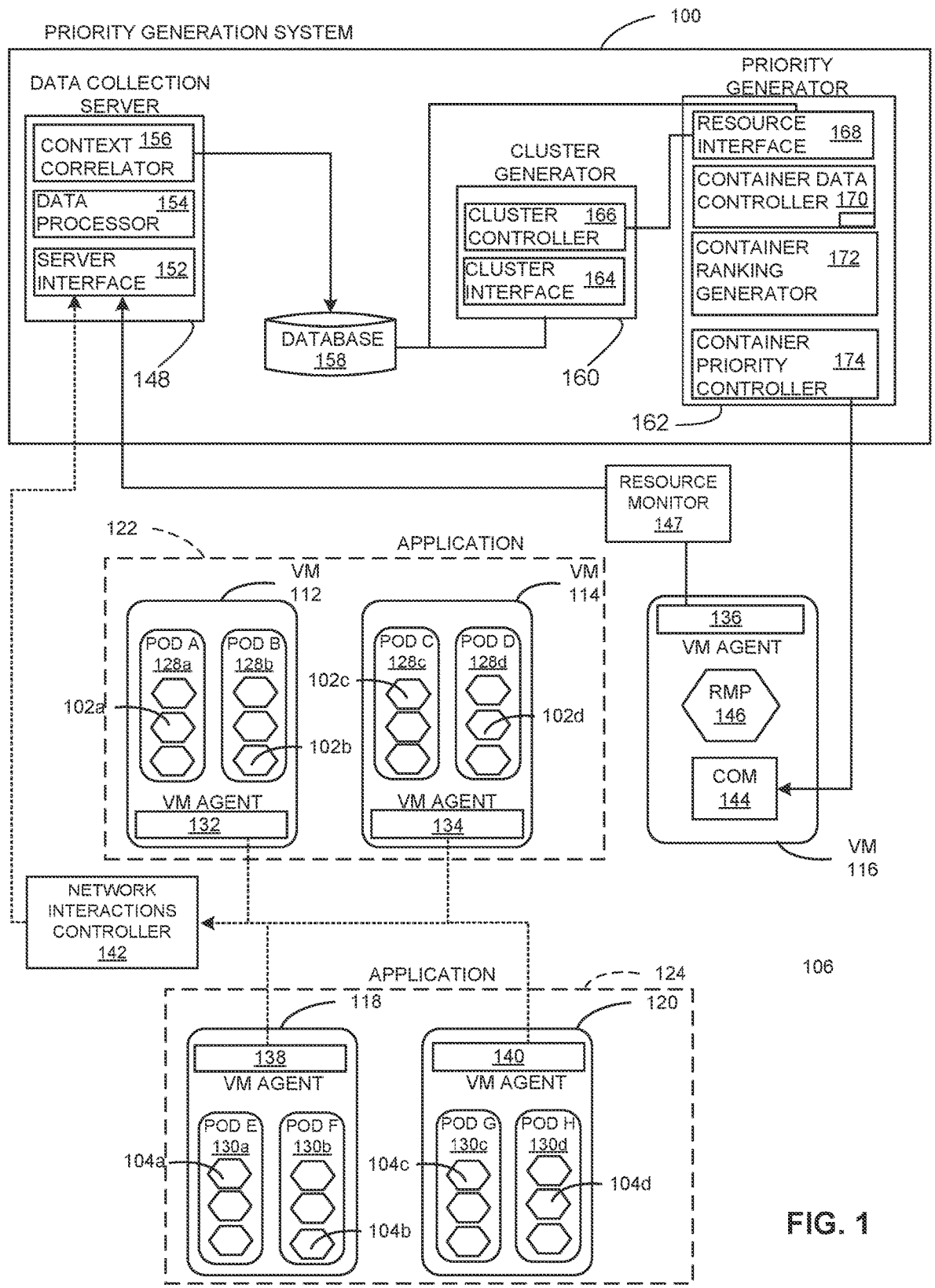
FIG. 1 illustrates an example virtual computing environment including an example priority generation system to prioritize example containers.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Cloud computing is based on the deployment of many physical resources across a network, virtualizing the physical resources into virtual resources, and provisioning the virtual resources in software defined data centers (SDDCs) for use across cloud computing services and applications. Examples disclosed herein can be used to improve performance and efficiencies of network communications between different virtual and/or physical resources of the SDDCs.

Examples disclosed herein can be used in connection with different types of SDDCs. In some examples, techniques disclosed herein are useful for managing network resources that are provided in SDDCs based on Hyper-Converged Infrastructure (HCI). In some examples, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment.

Examples disclosed herein can be used with an example virtualization environment, such as operating system (OS) virtualization. OS virtualization is also referred to herein as container virtualization. As used herein, OS virtualization refers to a system in which processes are isolated in an OS. In a typical OS virtualization system, a host OS is installed on the server hardware. Alternatively, the host OS can be installed in a virtual machine (VM) of a full virtualization environment or a paravirtualization environment. The host OS of an OS virtualization system is configured (e.g., utilizing a customized kernel, etc.) to provide isolation and resource management for processes that execute within the host OS (e.g., applications that execute on the host OS, etc.). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc. Example container orchestration managers include a Kubernetes® K8S™ software that coordinate and schedule the deployment and execution of containers associated with a distributed application (e.g., a containerized application). As used herein, the term "containerized application" refers to one or more isolated applications or services executing on a single host that have access to the same OS kernel. As used herein, the term "application containerization" refers to an OS-level virtualization method used to deploy and run distributed applications without launching an entire VM for each one of the distributed applications.

In some examples, an OS virtualization system may be managed and/or utilized by multiple developers and teams across multiple locations. For example, containerized applications and/or a containerized infrastructure may be developed, monitored, managed, updated, deployed, etc., by different developers. A containerized application may include one or more containers, also known as microservices, that perform specific tasks and/or services, such that the containerized application is a collection of containers in communication with one another. In an OS virtualization environment, container orchestration managers enable developers to prioritize containers of a containerized application in an effort to determine the containers (e.g., services, processes, etc.) that may be critical, important, etc., to the application. For example, host resources may undergo a resource crunch and may need to remove resources utilized by some containers. In such an example, the container orchestration manager may require information about container importance to determine which containers are to operate during such a resource crunch. Container orchestration managers provide features, such as Quality of Service (QoS), where developers can define and/or prioritize containers in a class. Example classes include best-effort, burstable, and guaranteed. Alternately, developers can specify priority of containers through a relative integer number in the container definition, using a custom defined priority class.

In some examples, assigning priority classes to containers across a containerized infrastructure before deploying the containers can be difficult because the developer may not have the information about the other containers, operating in the OS virtualization system, to decide the priority accordingly. For example, when multiple developers utilize the prioritizing feature of the container orchestration manager, a static allocation of priority classes are assigned to the containers. The static allocation of priority classes imposes a problem because static allocation of priority classes have a global impact. For example, when a new container is created with a high priority, then the high priority impacts the behavior of already deployed and operating containers in the containerized application during resource crunch situations. Containers operating with lesser priority than the new container are more likely to get killed and/or throttled (e.g., the process responsible for regulating the rate at which container processing is conducted, either statically or dynamically) by the container orchestration manager. In some examples, throttling the lower priority containers is intended. In other examples, throttling the lower priority containers is not intended which can cause problems for the existing containerized application. Therefore, developers need to consider the containers in the system before assigning and deploying the new container, so that the important containers are operating during critical system issues.

In some examples, the development life cycle of a containerized application slows down when the developer takes time to consider the other containers. In other examples, it may become impossible for the developer to consider containers in large scale virtualization infrastructures with multiple teams involved. As a result, many containers are deployed with incorrect priority classes, which is undesirable.

Examples disclosed herein include systems, methods, and apparatus to automatically generate relative priorities of the containers in one or more containerized applications in the OS virtualization system with respect to other containers. As used herein, a relative priority is a non-absolute value (e.g., a value that has the ability to change) corresponding to a meaning or significance of a container in relation to other containers. In some examples, the relative priority may correspond to the meaning or significance of applications, clusters, pods, or services in relation to other applications, clusters, pods, or services.

Examples disclosed herein include a priority generator to generate reports for developers and/or users. Such reports include the relative priorities containers in the virtualization system. For example, a report may include a list of containers ranked in a particular order corresponding to their relative priority. In some examples the priority generator assigns the relative priority to the containers. In other examples, developers utilize reports to assign, allocate, and/or prioritize containers before deploying the container. In some examples, reports generated by the priority generator decrease development time to develop containers or containerized applications. Additionally, generating a relative priority of containers improves peak load performance. For example, in the case of a peak load situation, where there is a resource crunch on the virtualization infrastructure, having a priority list assists in keeping critical applications running without any glitches (e.g., a short-lived fault in a system), as lower priority applications can be made to face the resource crunch situation first, either by a throttling or killing, thereby relieving resource pressure on the virtualized infrastructure.

In some examples, the priority generator analyzes previous container behavior, utilization metrics, and allocated resources, to determine a relative priority of the containers. For example, the priority generator may compare previous container behavior (e.g., how often did the container communicate with other containers) and utilization metrics of a first container with previous container behavior and utilization metrics of other containers to determine the relative priority.

FIG. 1 illustrates an example priority generation system 100 to prioritize example containers 102a-d and example containers 104a-d in an example virtual environment 106. The virtual environment 106 of FIG. 1 corresponds to a virtual or software-based abstraction of a physical environment. The physical environment may include a physical rack that includes a host. Alternatively, the physical environment may include a plurality of physical racks with a plurality of hosts. The host is a physical server including hardware-level components that may include one or more central processing units (CPUs), one or more memory devices, one or more storage units, one or more graphics processing units (GPUs), etc.

In some examples, the host executes a hypervisor, which provides local virtualization services to create the virtual environment 106. The hypervisor may be implemented using any suitable hypervisor (e.g., VMWARE® ESXI® hypervisor, Microsoft HYPER-V® hypervisor, and Kernel Based Virtual Machine (KVM)).

In some examples, the hypervisor instantiates VMs including an example first VM 112, an example second VM 114, an example third VM 116, an example fourth VM 118, and an example fifth VM 120. The hypervisor instantiates the VMs 112, 114, 116, 118, and 120 to execute an example first application 122 and an example second application 124. In the illustrated example of FIG. 1, the first application 122 and the second application 124 are containerized applications. For example, the VMs 112, 114 may deploy and/or otherwise include one or more pods, such as example pods 128a-d which may include one or more of the containers 102a-d to execute instances of distributed applications or services to facilitate execution of the first application 122. Additionally, the VMs 118, 120 may deploy and/or otherwise include one or more example pods 130a-d which may include one or more of the containers 104a-d to execute instances of distributed applications or services to facilitate execution of the second application 124. In the illustrated example of FIG. 1, a pod groups containers within a same VM. As used herein, a pod is a group of one or more containers (e.g., 102a-d, 104a-d) that include shared network and storage. A pod is a logical construct which couples containers (e.g., containers 102a-d, 104a-d) together. In some examples, a pod is a smallest divisible unit in a container orchestration manager (e.g., the Kubernetes™ software). In such examples, all containers in a pod remain together on the same VM in which that pod is scheduled.

In the illustrated example of FIG. 1, the first VM 112 includes a first pod 128a with a first set of three containers 102a and a second pod 128b with a second set of three containers 102b. The second VM 114 includes a third pod 128c with a third set of three containers 102c and a fourth pod 128d with a fourth set of three containers 102d. In some examples, each of the containers 102a-d executes a different distributed application. In other examples, one or more of the first containers 102a may execute the same distributed application as one or more of the second containers 102b. In the illustrated example of FIG. 1, the fourth VM 118 includes a fifth pod 130a with a fifth set of three containers 104a and a sixth pod 130b with a sixth set of three containers 104b. The fifth VM 120 includes a seventh pod 130c with a seventh set of three containers 104c and an eighth pod 130d with an eighth set of three containers 104d. In some examples, each of the containers 104a-d executes a different distributed application. In other examples, one or more of the fifth containers 104a may execute the same distributed application as one or more of the sixth containers 104b and one or more of the seventh containers 104c may execute the same distributed application as one or more of the eighth containers 104d.

In the illustrated example of FIG. 1, the VMs 112, 114, 116, 118, 120 include VM agents to intercept and/or otherwise obtain resource utilization metrics or network traffic events (e.g., one or more data packets, one or more data messages, etc.) associated with the containers 102a-d and 104a-d, the VMs 112, 114, 118, 120, and/or, more generally, the first application 122 and/or the second application 124. Accordingly, the first VM 112 includes an example first VM agent 132, the second VM 114 includes an example second VM agent 134, the third VM 116 includes an example third VM agent 136, the fourth VM 118 includes an example fourth VM agent 138, and the fifth VM 120 includes an example fifth VM agent 140. In some examples, network traffic between VMs passes through corresponding ones of the VM agents 132, 134, 136, 138, 140. For example, when a first one of the first containers 102a transmits a message to a first one of the second containers 102b, the message may pass through the first VM agent 132. In other examples, when a first one of the first containers 102a transmits a message to a first one of the third containers 102c, the message may pass through the first VM agent 132 and the second VM agent 134.

In some examples, the network traffic events include container information (e.g., container context information) and/or one or more tuples (e.g., a comma-separated sequence of values that can be used to group any number of items into a single compound value) including at least one of a source IP address (srcIP), a destination IP address (destIP), a source IP port (srcPort) number, a destination IP port (destPort) number, or a protocol identifier (protocol) (e.g., a type of communication protocol (e.g., TCP)). In some examples, the container context information includes a container identifier indicative of one of the containers 102a-d, 104a-d associated with the network traffic event. In some examples, the network traffic events have a format of <srcIP, destIP, srcPort, destPort, protocol, container>. For example, when a first one of the first containers 102a communicates with a second one of the third containers 102c, the first VM agent 132 may transmit a first network traffic event to the network interactions controller 142 corresponding to the first one of the first containers 102a that transmits a message and the second VM agent 134 may transmit a second network traffic event to the network interactions controller 142 corresponding to the second one of the third containers 102c that receives the message from the first container 102a.

The first network traffic event may be the following: (10.10.20.5, 10.10.30.5, 45543, 3456, TCP, containerX). In some examples, the first VM agent 132 appends a VM agent identifier to the first network traffic event before transmitting the first network traffic event to the network interactions controller 142. In examples disclosed herein, a VM agent identifier is an alphanumeric value that identifies a corresponding VM agent. For example, the first VM agent 132 may generate the following network traffic event by prepending, appending, or otherwise including the VM agent identifier: (VM Agent 1-10.10.20.5, 10.10.30.5, 45543, 3456, TCP, containerX). In such examples, VM Agent 1 indicates that the network traffic event is from the first VM agent 132. In such examples, 10.10.20.5 is a source IP address of the first one of the first containers 102a, 10.10.30.5 is a destination IP address of the first one of the third containers 102c, 45543 is a source IP port of the first one of the first containers 102a, 3456 is a destination port of the first one of the third containers 102c, TCP indicates the message is sent via transmission control protocol (TCP), and containerX indicates the first network traffic event is associated with the first one of the first containers 102a.

The second network traffic event may be the following: (10.10.30.5, 10.10.20.5, 3456, 45543, TCP, containerY). In some examples, the second VM agent 134 appends a VM agent identifier to the second network traffic event before transmitting the second network traffic event to the network interactions controller 142. For example, the second VM agent 134 may generate the following network traffic event by prepending, appending, or otherwise including the VM agent identifier: (VM Agent 2-10.10.30.5, 10.10.20.5, 3456, 45543, TCP, containerY). In such examples, VM Agent 2 indicates that the network traffic event is from the second VM agent 134. In such examples, 10.10.30.5 is a source IP address of the first one of the third containers 102c, 10.10.20.5 is a destination IP address of the first one of the first containers 102a, 3456 is a source IP port of the first one of the third containers 102c, 45543 is a destination port of the first one of the first containers 102a, TCP indicates the message is sent via transmission control protocol (TCP), and containerY indicates the second network traffic event is associated with the first one of the third containers 102c.

When the network interactions controller 142 obtains the first and second network traffic events, the network interactions controller 142 determines that the first one of the containers 102a (containerX) is in communication with the second one of the containers 102b (containerY). Over time, the network interactions controller 142 can determine a quantity of the containers 102a-d that are communicating, which of the one or more first containers 102a are in communication with which of the one or more second, third, fourth, and fifth containers 102b-d, associate ones of the containers 102a-d that are in communication with each other as a cluster, and identify the cluster as the first application 122. Alternatively, the network interactions controller 142 can determine a quantity of the containers 104a-d that are communicating and additionally associate ones of the containers 104a-d that are in communication with each other as a cluster and identify the cluster as the second application 124.

The example network interactions controller 142 may be deployed by and/or otherwise included in the hypervisor. The example network interactions controller 142 generates the container traffic messages based on network traffic events from the VM agents 132, 134, 136, 138, 140. For example, the container traffic messages may correspond to network traffic events that are associated with one of the containers 102a-d, 104a-d. In such examples, the container traffic messages can be used to define the first application 122 and the second application 124, generate a topology associated with the first application 122 and the second application 124, etc.

Further depicted in FIG. 1, the third VM 116 includes an example container orchestration manager (COM) 144 and an example resource monitor plugin (RMP) 146. The COM 144 of the illustrated example of FIG. 1 is a container that provisions, schedules, and/or otherwise manages the containers 102a-d, 104a-d. For example, the COM 144 may be a management entry point for a user (e.g., an administrator, a developer, an external computing device, etc.) for the containers 102a-d, 104a-d instead of invoking a virtual policy appliance to perform an operation associated with the containers 102a-d, 104a-d. For example, the COM 144 may be a container that facilitates Kubernetes® K8S™ software to coordinate and schedule the deployment and execution of the containers 102a-d, 104a-d associated with the first application 122 and second application 124.

The COM 144 includes tools for managing and automating the lifecycle of the example containers 102a-d, 104a-d. In some examples, the COM 144 provides users (e.g., an administrator, a developer, an external computing device, etc.) a QoS feature which determines the scheduling and eviction priority of the pods 128a-d, 130a-d. For example, the QoS feature receives user inputs, such as allocated resources, and assists users in signifying the importance of ones of the containers 102a-d, 104a-d based on the allocated resources, by classifying them into pre-defined priority classes (e.g., QoS classes). The QoS feature may classify ones of the containers 102a-d, 104a-d into three classes. The first class is the guaranteed class. A container may be classified into the guaranteed class when a user determines the container is top-priority and are guaranteed to not be terminated or throttled until the container exceeds specified limits. In some examples, a container related to business-critical services are deployed with this priority class. The second class is the burstable class. A container may be classified into the burstable class when a user determines the container requires a minimal resource guarantee but can use more resources if available. However, under system memory pressure, containers classified as burstable are more likely to be killed (e.g., receive a termination signal requesting that the container exit) once the containers exceed requests. For example, if a CPU is fully occupied with running container workloads, the burstable containers may be throttled. The third class is best-effort class. A container may be classified into the best-effort class when a user determines the service is low priority. A container in the best-effort class is the first to terminate if the system (e.g., virtual environment 106) runs out of memory. Best-effort containers can use any amount of free memory available in the pod until the CPU is fully occupied, then the best-effort containers are the first to be throttled of resource usage.

However, the virtual environment 106 may be shared among multiple users. Therefore, containers (e.g., containers 102a-d, 104a-d) may be developed and classified by multiple users. Allowing multiple users to configure aspects of this QoS feature can lead to inaccurate and/or misleading container classifications due to multiple user inputs. Therefore, the example COM 144 may provide the allocated resources to the priority generation system 100 to determine the priority class for ones of the containers 102a-d, 104a-d.

The RMP 146 of the illustrated example of FIG. 1 is executed in a container. In some examples, the RMP 146 registers the COM 144 with the resource monitor 147 that provides an intent-based system to facilitate monitoring the performance of containers and/or operations of virtual network resources. An intent-based system is a system (e.g., the resource monitor 147) that eliminates the need for manual network configurations and inputs that are required to monitor the performance of containers and/or operations of virtual network resources. In an intent-based system, a network self-configures in response to user-submitted requests (e.g., requests for particular network operation or network configuration submitted by an administrator). For example, the RMP 146 may obtain utilization metrics from the COM 144 and transmit the utilization metrics to the resource monitor 147. In such examples, the RMP 146 can determine the utilization metrics by identifying a cluster (e.g., a group of VMs executing an application, such as the first application 122 and/or the second application 124) that includes the VMs 112, 114, 118, 120, ones of the containers 102*a-d*, 104*a-d* that are included in the VMs 112, 114, 118, 120, and services associated with the ones of the containers 102*a-d*, 104*a-d*. The RMP 146 can transmit the utilization metrics to the resource monitor 147. The example resource monitor 147 may be implemented by an open source suite such as Grafana® software, Datadog® software, Wavefront℠ software, etc. and deployed in the virtual environment 106. In some examples, the resource monitor 147 may obtain utilization metrics from the VM agents 132, 134, 136, 138, 140 instead of or in addition to the RMP 146.

As used herein, utilization metrics may be resource utilization metrics. Resource utilization metrics are indicative of measures of utilization of allocated resources. For example, allocated resources are allocated by developers, to ones of the pods 128*a-d*, 130*a-d* that provide processing capabilities to ones of the containers 102*a-d*, 104*a-d* operating in the virtual environment 106. In some examples, allocated resources include compute resources (e.g., central processing units (CPUs) or virtual CPUs (e.g., vCPU), memory, etc.), network resources (e.g., network input/output operations (IOPS) allowed per second, network bandwidth, etc.), storage resources (e.g., disk time, storage IOPS, etc.), etc. Resource utilization metrics include values corresponding to ones of the containers 102*a-d*, 104*a-d*, indicative of resource usage for a period of time.

In the illustrated example of FIG. 1, the example priority generation system 100 includes the data collection server 148 to obtain network interaction metrics, allocated resource data, and resource utilization metrics. The example data collection server 148 maps the information to the containers 102*a-d*, 104*a-d*. For example, the data collection server 148 generates data tables to map network interaction metrics, allocated resource data, and utilization metrics to the containers 102*a-d*, 104*a-d*. The data collection server 148 obtains network interaction metrics from the example network interactions controller 142.

In operation, the VM agents 132, 134, 136, 138, 140 obtain network interaction metrics corresponding to data packets or messages transmitted by one or more of the containers 102*a-d*, 104*a-d*, one or more of the VMs 112, 114, 116, 118, 120, and/or, more generally by the first application 122 and/or the second application 124. The VM agents 132, 134, 136, 138, 140 may include a VM agent identifier in the network traffic events to indicate to the data collection server 148 which one of the VM agents 132, 134, 136, 138, 140 transmitted a corresponding one of the network traffic events.

In the illustrated example of FIG. 1, the data collection server 148 includes an example server interface 152, an example data processor 154, and an example context correlator 156. The server interface 152 of the illustrated example is a communication interface that obtains container traffic messages from the network interactions controller 142 and obtains allocated resource data and resource utilization metrics from the resource monitor 147. For example, the server interface 152 may be a Rackspace Private Cloud (RPC) server and obtains information from the network interactions controller 142 of the hypervisor via VMWARE NSX™ RPC protocol. Alternatively, the example server interface 152 may be any other type of network interface using any other type of protocol to obtain and/or transmit data. In some examples, the example server interface 152 queries (e.g., periodically or aperiodically queries) the network interactions controller 142 for container traffic messages. Alternatively, the example server interface 152 may obtain the container traffic messages when generated. Additionally, the example server interface 152 obtains allocated resources and resource utilization metrics from the resource monitor 147. For example, the server interface 152 may query the resource monitor 147 for allocated resources and resource utilization metrics and/or alternatively may obtain allocated resources and resource utilization metrics when generated.

The example data processor 154 of the data collection server 148 processes the container traffic messages by extracting data (e.g., metadata) from the container traffic messages and organizing the extracted data to be analyzed by the context correlator 156. In some examples, the data processor 154 extracts data from the container traffic messages that includes the container context information and/or one or more of the tuples associated with the network traffic events as described above. In some examples, the data processor 154 extracts data from the resource utilization metrics and the allocated data. For example, the data processor 154 extracts values associated with resources from the resource utilization metrics and the allocated resource data to be organized by the context correlator 156.

The context correlator 156 of the illustrated example of FIG. 1 generates container information based on at least one of container context information (e.g., a container pod identifier, an IP address, an IP port, etc., of one of the containers 102*a-d*, 104*a-d*), virtual network resources (e.g., a logical router, a logical switch, etc., associated with one of the containers 102*a-d*, 104*a-d*), or run-time network traffic associated with the containers 102*a-d*, 104*a-d*.

In some examples, the container information corresponds to one or more tables or an inventory of virtual resources (e.g., an organization of the virtual resources) associated with the first and second applications 122, 124. For example, the inventory may include the containers 102*a-d* with corresponding container context information. In other examples, the inventory can include virtual network resources, such as a logical switch, a logical router, etc., and/or information defining and/or otherwise specifying the virtual network resources that are associated with the first and second applications 122, 124.

In some examples, the container information corresponds to one or more entries in an interaction count table. For example, the context correlator 156 may generate an entry in the interaction count table corresponding to the first one of the first containers 102*a* having a communication connection to the first one of the second containers 102*b* when the first network traffic event and the second network traffic event as described above have the same tuples. The entries may indicate a count of interactions between ones of the containers 102*a-d*, 104*a-d* and/or more generally, ones of the pods 128*a-d*, 130*a-d*.

In some examples, the container information is collected for a pre-determined period of time. For example, the server interface 152 may obtain network traffic messages from the network interactions controller 142 for a duration of time, specified by the user. The network interactions controller 142 may be configured to collect a number of samples (e.g., network interaction metrics) from the VM agents 132, 134, 136, 138, 140 every time period for a duration of time. For example, every five minutes, the network interactions controller 142 collects 15 samples of data for 20 seconds and provides the samples to the server interface 152. Additionally, the server interface 152 may obtain resource utilization metrics for the same duration of time, specified by the user. In this manner, the example context correlator 156 generates container information for the period of time. In some examples, the context correlator 156 aggregates counts of network traffic messages for network interactions between two pods (two of the pods 128a-d, 130a-d) during the period of time.

The example context correlator 156 stores the container information in an example database 158. For example, a cluster generator 160 may obtain the allocated resource data from the database 158 to determine clusters of containers. In other examples, a priority generator 162 may obtain utilization metrics and network interaction metrics from the database 158 to determine a relative priority class for ones of the containers 102a-d, 104a-d. In FIG. 1, the example data collection server 148 is in communication with the database 158 via an intra-process communication protocol. Alternatively, the example data collection server 148 may use any other type of protocol.

In the illustrated example of FIG. 1, the cluster generator 160 includes an example cluster interface 164 and an example cluster controller 166. The example cluster interface 164 obtains and/or otherwise retrieves allocated resource data from the database 158. For example, the cluster interface 164 queries the database 158 for allocated resource data corresponding to the containers 102a-d, 104a-d in the virtual environment 106. In some examples, the cluster interface 164 obtains allocated resource data to provide to the cluster controller 166.

The cluster controller 166 of FIG. 1 analyzes the allocated resource data corresponding to the containers 102a-d, 104a-d to determine similar ones of the containers 102a-d, 104a-d. For example, the cluster controller 166 determines k clusters of containers, where each cluster includes containers with similar features, such as allocated resources. A cluster is a group of containers with similar utilization metrics. Since pods are a logical collection of containers, the containers in the same pod (e.g., the first containers 102a deployed in the first POD A 128a) will be together in one cluster with containers of other pods (e.g., the second containers 102b deployed in POD B 128b), when the other pods include similar features. For example, when POD A 128a and POD E 130a include similar features, such as the same type(s) of allocated resources, the cluster controller 166 may group the first containers 102a with the fifth containers 104a into a cluster.

In operation, the cluster controller 166 retrieves allocated resources corresponding to the containers 102a-d, 104a-d and/or more generally, the pods 128a-d and 130a-d in the virtual environment 106. The allocated resources may include one or more resource types allocated to ones of the pods 128a-d, 130a-d. For example, the pods 128a-d, 130a-d are allocated certain resources (e.g., memory usage, network bandwidth, CPU space, etc.) The example containers 102a-d, 104a-d that are executed within the pods 128a-d, 130a-d utilize the resources allocated to the pods 128a-d, 130a-d. Further, the example cluster controller 166 determines N number of allocated resources allocated to the containers 102a-d, 104a-d. For example, the cluster controller 166 determines a count of N distinct resource usage types assigned by the user across all containers 102a-d, 104a-d.

In some examples, the cluster controller 166 determines allocated resource values for containers 102a-d, 104a-d in the virtual environment 106. For example, the N distinct resource usage types may be provided with a value of maximum and/or minimum usage that ones of the containers 102a-d, 104a-d can utilize. For example, a user specifies that 16 GB of memory can be utilized by the first containers 102a (e.g., POD A 128a) and up to 6 GB of memory can be utilized by the third containers 104a (e.g., POD E 130a). The example cluster controller 166 may determine the values assigned to the containers 102a-d, 104a-d. Resources allocated by the developer to the containers 102a-d, 104a-d may be a reflection of the weight and impact of the containers 102a-d, 104a-d on the virtual environment 106, based on the developers' understanding.

Furthermore, the cluster controller 166 generates k clusters of containers based on the N number of allocated resources and the allocated resource values, where k is the number of clusters created. The clusters may identify the k different types of substantially different containers in the virtual environment 106 by identifying the containers apparent size (e.g., the allocated resources). In some examples, the cluster controller 166 utilizes clustering algorithms to create k clusters of containers. For example, the cluster controller 166 utilizes k-means clustering (e.g., elbow clustering, silhouette clustering, gap statistic clustering, etc.) to generate k clusters. Alternatively, the example cluster controller 166 utilizes G-means clustering or any other unsupervised clustering algorithm to group similar ones of containers 102a-d, 104a-d. Alternatively, the example cluster controller 166 can utilize a fixed and/or predefined number of clusters based on heuristics and data points to reduce the response time of the cluster controller 166.

In some examples, the cluster controller 166 tags clusters with an identifier, such as a k identifier, where k corresponds to the cluster identifier number. For example, if the first containers 102a include similar allocated resources as the second containers 102b, the first containers 102a and the second containers 102b may be grouped into a first cluster and tagged with a k cluster identifier number 1. In some examples, the first one of the first containers 102a and the second one of the first containers 102a have different allocated resources. In such an example, the first one of the first containers 102a may include similar allocated resources as the first ones of the second and third containers 102b, 104a, and the second one of the first containers 102a may include similar allocated resources as the second ones of the second and third containers 102b, 104a. In such an example, the first one of the first containers 102a, the first one of the second containers 102b, and the first one of the third containers 104a may be grouped in a first cluster and tagged with a k identifier number 1. Further, the second one of the first containers 102a, the second one of the second containers 102b, and the second one of the third containers 104a may be grouped in a second cluster and tagged with a k identifier number 2.

The example cluster controller 166 may provide the clusters of containers to the priority generator 162 to generate relative priority classes for the containers 102a-d, 104a-d. For example, the priority generator 162 analyzes and compares the containers 102a-d, 104a-d on a cluster-by-cluster basis. The example cluster generator 160 inherently captures the developer understanding of the containers 102a-d, 104a-d because the developer understanding is reflected in the allocated resources assigned to the containers 102a-d, 104a-d. Therefore, the containers within a cluster are peers, and subsequent comparisons may occur among the containers within the cluster, thus, causing comparisons and rankings to be more accurate. For example, comparing containers of similar type (e.g., containers that utilize the same resources) increases accuracy of priority ranking because comparing containers with dissimilar resources reduces the meaning and/or significance of the priority generation. In some examples, the priority classes assigned to the containers 102a-d, 104a-d may be indicative that one of the containers corresponds to a greater priority than other ones of the containers. In other examples, the priority classes may be indicative that one of the containers corresponds to a lesser priority than other ones of the containers.

The priority generator 162 includes an example resource interface 168, an example container data controller 170, an example container ranking generator 172, and an example container priority controller 174. The example resource interface 168 obtains clusters of containers from the cluster controller 166. For example, the resource interface 168 may query the cluster controller 166 for clusters. In other examples, the resource interface 168 receives one or more clusters upon generation.

In operation, the example priority generator 162 may analyze one cluster of containers at a time. Therefore, the example resource interface 168 may query the example cluster controller 166 for containers with the same cluster identifier. For example, the resource interface 168 receives containers grouped in clusterA (e.g., clusterA may be the k identifier). The example resource interface 168 may receive containers in the form of a list and may initialize a first container (e.g., first one of containers 102a) in clusterA to be analyzed. For example, cluster controller 166 may organize the containers in clusterA in order of development and/or deployment (e.g., oldest container to newest container) or any type of randomized list. In some examples, the resource interface 168 passes the containers and corresponding container information to the container data controller 170 for further processing.

For example, the resource interface 168 obtains the time-based resource utilization metrics and network interaction metrics from the database 158 and provides the information to the container data controller 170. The example container data controller 170 analyzes the containers in the cluster to determine container characteristic metrics. For example, container characteristic metrics include median utilization resource values and interaction values. A median utilization resource value corresponds to the middle one of the samples collected by the example resource monitor 147 of allocated resource R utilized by containerX. For example, the container data controller 170 may initialize the first resource R in the time-based resource utilization metrics corresponding to containerX to be analyzed. In some examples, the median of the resource utilization values is determined, not the average, because there may be a significant variation in resource utilization values (e.g., due to spikes in resource usage when ones of the containers 102a-d, 104a-d is operating) which may cause the average of the utilization values to be affected. Therefore, the median value more accurately defines the usage of resource R by containerX. In some examples, the median utilization resource value may be a median utilization metric information, a sample median resource value, a median resource usage value, etc.

In some examples, the container data controller 170 stores median resource utilization values in a memory 169. In some examples, the container data controller 170 stores median resource utilization values in the memory 169 with a container identifier (e.g., containerX, containerY, etc.) for identification by the container ranking generator 172. In some examples, the container data controller 170 continues processing (e.g., determining median resource utilization values) the allocated resources for the containers in the clusterA until the median resource utilization values have been determined and the memory 169 has been populated.

The example container data controller 170 analyzes the network interaction metrics corresponding to the containers in clusterA to determine the representative interaction count values for the containers. For example, the container data controller 170 obtains the total number of network interactions between a first container (e.g., container X) and all other containers in the clusterA (e.g., containerY, containerZ, etc.). The total number of network interactions for a container is called the representative interaction count value. In some examples, the representative interaction count value may be an interaction metric information, a total interaction value, etc. In some examples, the container data controller 170 determines the representative interaction count value for containerX for a period of time. For example, the network interactions controller 142 obtains network interaction metrics for 20 seconds. Therefore, the example container data controller 170 determines the representative interaction count value of the 20 seconds. The example container data controller 170 stores the representative interaction count values for the containers in the cluster in the memory 169. In some examples, the container data controller 170 stores the representative interaction count values in the memory 169 with a container identifier (e.g., containerX, containerY, etc.) for identification by the container ranking generator 172.

In the illustrated example of FIG. 1, the priority generator 162 includes the container ranking generator 172 to determine a resource utilization ranking of the containers for each allocated resource. As used herein, the resource utilization ranking corresponds to plots of containers on a resource line, wherein each resource line corresponds to a resource. The containers are plotted on the resource line based on the container characteristic metrics. For example, the containers are ranked based on the representative interaction count value and the median resource utilization values. For example, the resource line is a horizontal line. A container located on the leftmost side of the resource line may have the lowest representative interaction count value and the lowest median resource utilization value. A container located on the rightmost side of the resource line may have the highest representative interaction count value and the highest median resource utilization value. In this manner, the resource utilization rankings corresponds to the amount of the resource the containers in the cluster utilize. The resource utilization ranking is described in further detail below in connection with FIG. 3.

The example container ranking generator 172 further determines a resource utilization rank value for each container based on the resource utilization ranking and the number of containers in the cluster. As used herein, the resource utilization rank value is a percentage of containers that have representative interaction count values and/or median resource utilization values less than or equal to the representative interaction count value and/or the median resource utilization value of the container. For example, the container ranking generator 172 determines the resource utilization rank value for containerX of resource R. The container ranking generator 172 utilizes the resource utilization ranking to determine the number of containers that include lower median resource utilization values and representative interaction count values than containerX. In some examples, the resource utilization rank value of containerX is indicative that containerX corresponds to a higher utilization of resource R than containerY. A resource utilization rank value is determined for each container in the cluster for each resource. For example, if clusterA corresponds to 5 resources (e.g., CPU, memory, network bandwidth, disk time, and network IOPS) and includes 3 containers (e.g., containerX, containerY, and containerZ), then 15 utilization rank values are determined (e.g., for CPU: containerX, containerY, containerZ; for memory: containerX, containerY, containerZ; etc.).

Additionally, the example container ranking generator 172 determines aggregated resource utilization rank values for each container based on the utilization rank values. As used herein, the aggregated resource utilization rank value is a sum of weighted resource utilization rank values for a container. In some examples, a weight value is assigned to a resource usage type. For example, a CPU resource usage type may have a higher weight value than a memory resource usage type or vice versa. The weight values may be configured based on user preferences. For example, the user may utilize the COM 144 to configure weights for the resource usage types. In some examples, a user may not configure the weights and therefore, the weights may be equal to each other by default (e.g., the weights equal 1).

The example container ranking generator 172 determines an aggregated resource utilization rank value for each container in the cluster. The aggregated resource utilization rank values may be indicative of the container utilization of resource usage types, relative to the containers in the cluster. For example, the container ranking generator 172 determines the aggregated resource utilization rank value for containerX is 100 and the aggregated resource utilization rank value for containerY is 20. In such an example, containerX utilizes resources more than containerY. The aggregated resource utilization rank values may be represented using an integer value, a numeric value, a binary value, a decimal value, etc., in which the container priority generator 172 can obtain and process.

In the illustrated example of FIG. 1, the priority generator 162 includes the container priority controller 174 to generate priority classes for containers based on the aggregated resource utilization rank values. For example, the container priority controller 174 organizes the containers in chronological order based on the corresponding aggregated resource utilization rank values. In some examples, the chronological order signifies the order in which the containers fare in terms of the resource utilization metrics. Additionally, the chronological order of containers may signify the order of containers based on the utilization metrics and the configured resource weights. In some examples, the chronological order is a priority list of the containers. In such examples, the container priority controller 174 assigns a priority class to each container that is equal to the index of the container. For example, the container priority controller 174 may return the position of the container in the priority list as an index value (e.g., index0, index1, index2, index3, etc.) and then assign the priority class as equal to the index of the container.

In addition, the example container priority controller 174 may determine a QoS class for the containers (e.g., guaranteed, burstable, and best-effort). The example container priority controller 174 may receive an instruction to determine the QoS class for the containers. In such examples, the container priority controller 174 separates the priority list of containers into three sections having the same number of containers in each section (e.g., if there are nine indexes, there will be three containers in each section). In some examples, if the priority list is ordered from highest priority to lowest priority, where index0 corresponds to the container with the highest utilization and index8 corresponds to the container with the lowest utilization, the container priority controller 174 classifies index0 to index2 as guaranteed, index3 to index5 as burstable, and index6 to index8 as best-effort. Alternatively, the priority list of containers may be ordered from lowest priority to highest priority. Therefore, the container priority controller 174 classifies the containers accordingly.

In some examples, the container priority controller 174 provides the priority list, container priority information, priority information, etc. to the COM 144. In such examples, the COM 144 may obtain the container priority information from the container priority controller 174 to generate a visualization output to a user. For example, the COM 144 may invoke an application programming interface (API) (e.g., a user interface (UI) API) to launch a graphical user interface (GUI) to display the visualization output to the user. In some examples, the user may utilize the container priority information to deploy new containers, applications, etc., in the virtual environment 106. In this manner, containers 102a-d, 104a-d can be deployed with an accurate priority class, enabling the virtual environment 106 to operate efficiently. For example, the container priority information assists the users in maintaining functionality of high priority containers during resource crunch.

FIG. 2 illustrates data tables stored in the database 158 that may be representative of allocated resources, utilization metrics, and network interaction metrics collected by the network interactions controller 142 and the resource monitor 147 and organized by the context correlator 156. FIG. 2 includes an example allocated resources table 200 representative of allocated resources, an example utilization metrics table 202 representative of utilization metrics of a container (e.g., one of the containers 102a-d, 104a-d), and an example network interaction metrics table 204 representative of network interaction metrics.

In the illustrated example of FIG. 2, the database 158 includes the allocated resources table 200, organized by the context correlator 156. The context correlator 156 determines a first column 206 representative of resources allocated to ones of the pods 128a-c, a second column 208 representative of the resource metrics allocated to POD A 128a, a third column 210 representative of the resource metrics allocated to POD B 128b, and a fourth column 212 representative of the resource metrics allocated to POD C 128c. In some examples, the allocated resources illustrated in the allocated resources table 200 are configured by a user. The user may configure and deploy containers (e.g., 102a-c) in PODA 128a, PODB 128b, and/or PODC 128c. In this manner, the containers (e.g., 102a-c) may utilize the allocated resources of the first column 206 to provide and/or perform services. For example, the first containers 102a deployed in the first PODA 128a may be limited to and/or request the resource metrics illustrated in the second column 208 (e.g., the first containers 102a may be limited to 2 CPUs, 16 GB of memory, 30 ms of disk time, etc.). The second containers 102b deployed in the second PODB 128b may be limited to and/or request the resource metrics illustrated in the third column 210 (e.g., the second containers 102b may be limited to 1 CPU, 4 GB of memory, 10 GB of storage, no disk time, etc.). The third containers 102c deployed in the third PODC 128c may be limited to and/or request the resource metrics illustrated in the fourth column 212 (e.g., the third containers 102c may be limited to 3 CPUs, 6 GB of memory, 10 GB of storage, etc.).

In some examples, the cluster generator 160 utilizes information provided in the allocated resources table 200 to determine clusters of containers in the pods. For example, the cluster controller 166 generates clusters based on the resources allocated to the pods, as illustrated in the second column 208, the third column 210, and the fourth column 212.

In the illustrated example of FIG. 2, the database 158 includes the utilization metrics table 202, organized by the context correlator 156. The context correlator 156 determines a fifth column 214 representative of resources allocated to containerX and a first row 216 representative of utilization metrics for a first resource (e.g., virtual CPU) collected over an interval of time. For example, utilization metrics are collected for pre-defined intervals of time with a certain frequency. For example, the utilization metrics can be collected every 10 minutes for 24 hours, and a utilization metric data collected at an interval corresponds to the resource utilization over the duration (e.g., 10 minutes of that interval). In some examples, the resource monitor 147 collects the utilization metrics, illustrated in the first row 216, for different observation periods (e.g., Tn, Tn-1, Tn-2, etc.). For example, the resource monitor 147 collects vCPU usage by containerX for a first observation 218, a second observation 220, a third observation 222, and a fourth observation 224.

In some examples, the container data controller 170 obtains the utilization metrics illustrated in the utilization metrics table 202 to determine the median utilization resource value for containerX. For example, the container data controller 170 determines a first median utilization resource value utilizing Equation 1 below. In Equation 1, x is a row in the utilization metrics table 202 (e.g., the first row 216) for a resource (r), i represents a container in the cluster (e.g., containerX), and t represents the time interval. Equation 1 may be repeated until the median utilization resource value has been determined for the resources of each container in the cluster. In some examples, the median utilization resource value is a value corresponding to the median usage of resource r by containerX.

$$\text{Median Utilization Resource Value}_i^r = \text{Median } (x_i^r)t \quad \text{Equation 1}$$

In the illustrated example of FIG. 2, the database 158 includes the network interaction metrics table 204, organized by the context correlator 156. The example context correlator 156 determines a sixth column 226 representative of a source pod, a seventh column 228 representative of a destination pod, and an eighth column 230 representative of a network interaction count between the source pod and the destination pod. For example, the network interactions controller 142 obtains the container network interaction metrics, via the VM agents 132, 134, 138, 140, for each container and the context correlator 156 aggregates the network interaction metrics for each source pod to destination pod. In the network interaction metrics table 204, the first containers 102a in PODA 128a communicated to the second containers 102b in PODB 128b a total of 35 times, the third containers 102c of PODC 128c communicated to the second containers 102b of PODB 128b a total of 140 times, and the second containers 102b of PODB 128b communicated to the fourth containers 102d of PODD 128d a total of 3 times.

In some examples, the container data controller 170 obtains the network interaction metrics illustrated in the network interaction metrics table 204 to determine the representative interaction count values for containerX. For example, the container data controller 170 determines a first representative interaction count value utilizing Equation 2 below. In Equation 2, i represents a source container in the cluster, m represents a destination container in the cluster, and $x_{im}$ represents a row in the network interaction metrics table 204. Equation 2 may be repeated until the representative interaction count values have been determined for the source container with all other containers.

$$\text{Representative Interaction Value}_i = \Sigma x_{im} \quad \text{Equation 2}$$

Figure 3:
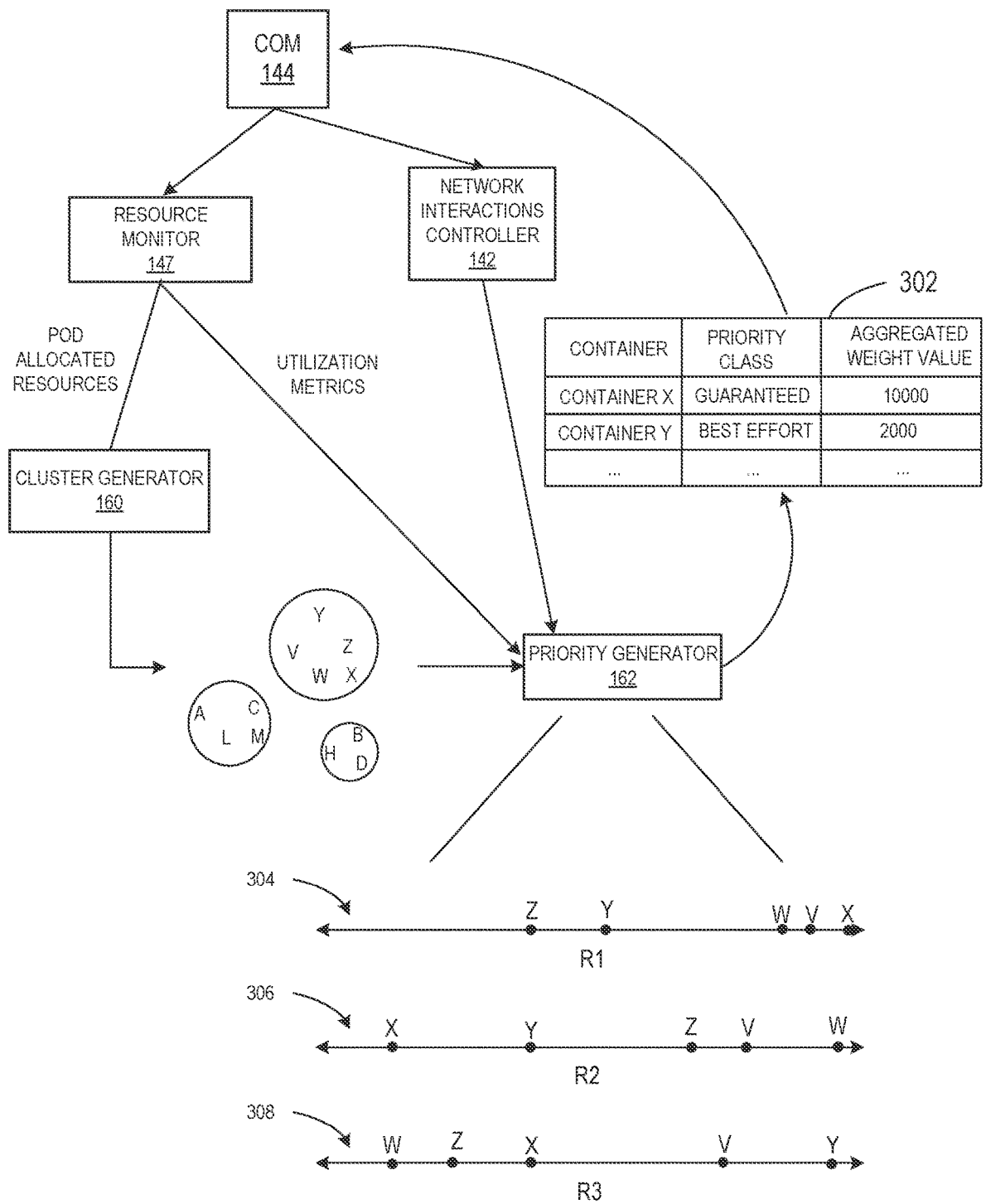
FIG. 3 illustrates an example block diagram of an implementation of the virtual computing environment of FIG. 1.

FIG. 3 illustrates an example block diagram of priority monitoring information flow 300 implemented in the virtual environment 106 of FIG. 1. FIG. 3 includes the example COM 144, the example resource monitor 147, the example network interactions controller 142, the example cluster generator 160, the example priority generator 162, and an example priority list 302.

In the illustrated example of FIG. 3, the priority monitoring information flow 300 includes the COM 144 to manage the resource monitor 147 and the network interactions controller 142. For example, the COM 144 provides information corresponding to data collection frequency and data collection time-intervals. In some examples, the COM 144 initiates the resource monitor 147 and network interactions controller 142 to collected utilization metrics and network interaction metrics. In other examples, the COM 144 provides allocated resource data to the resource monitor 147. Additionally or alternatively, the resource monitor 147 obtains allocated resource data from the COM 144.

In operation, the resource monitor 147 obtains allocated resources for containers 102a-d, 104a-d across pods 128a-d, 130a-d in the virtual environment 106 and provides the information to a data collection server (e.g., the data collection server 148 of FIG. 1). The data collection server may store the allocated resources in a database (e.g., the database 158 of FIG. 1). In some examples, the cluster generator 160 obtains the allocated resources. For example, the cluster interface 164 queries the database for allocated resources. When the cluster interface 164 obtains allocated resources, the cluster controller 166 determines a number of allocated resources allocated to the containers. For example, turning to FIG. 2, the cluster controller 166 may utilize the allocated resources table 200 to determine that the first containers 102a are allocated eight resources, the second containers 102b are allocated five resources, and the third containers 102c are allocated four resources. In such an example, the cluster controller 166 determines there are eight distinct resources across the containers 102a-c. For example, the second containers 102b and third containers 102c share the same resource usage types as the first containers 102a, therefore there are a total of eight distinct resource usage types.

In some examples, the cluster controller 166 determines the allocated resource values for all containers in the virtual environment 106. For example, the cluster controller 166 may analyze the second column 208, the third column 210, and/or the fourth column 212 to determine the allocated resource values for the containers 102a-c.

Further, the cluster controller 166 generates clusters of containers (e.g., pods including the containers) based on the number of allocated resources. For example, the cluster controller 166 performs an N-dimensional k-means clustering of the containers, where N is the total count of distinct allocated resources. The example cluster controller 166 uses a clustering algorithm to partition pods (e.g., pods 128a-d, pods 130a-d, and/or any other pods in the virtual environment 106) into k pre-defined, distinct, non-overlapping subgroups (e.g., clusters) where each pod belongs to only one group. For example, the cluster controller 170 assigns one or more of the pods to a cluster, such that the sum of the squared distance between the pods' N allocated resources and the cluster's centroid (e.g., an arithmetic mean of allocated resources per pod that belongs to that cluster) is at the minimum. For example, the cluster controller 166 classifies the first containers 102a into a cluster with the second containers 102b based on the first containers 102a having a number of distinct allocated resources within a threshold number of distinct allocated resources corresponding to the second containers 102b. In examples disclosed herein, the distance corresponds to the threshold number of distinct allocated resources (N). When an arithmetic mean is N=8, a container having N=7 distinct allocated resources has a distance=1 from the arithmetic mean. As used herein, a distinct allocated resource is a resource that is counted only once even if two or more instances of that resource are allocated to a container. For example, a container that is allocated three CPUs, four gigabytes of RAM, and two network interface cards (NICs) has three distinct allocated resources (e.g., CPU resources, memory resources, and NIC resources for a total of three distinct types of allocated resources). As used herein, the threshold number corresponds to the minimum distance between a distinct number of the pod's allocated resources and the cluster's centroid. For example, the cluster controller 166 groups the containers based on a threshold number of fewer or more resources than N allocated resources. For example, the cluster controller 166 determines the cluster's centroid is eight, where eight corresponds to one or more pods having, on average, eight distinct resources. In this example, the containers that satisfy the threshold number of fewer or more resources than N allocated resources are grouped together as a first cluster. The containers that do not satisfy and/or meet the threshold number of fewer or more resources are not grouped in the first cluster. For example, the threshold number may be equal to 1, where pods having 1 less or 1 more allocated resource may be grouped into a cluster. The groups of containers generated are the k number of clusters for the virtual environment 106. For example, if three clusters of containers are generated, then k is equal to 3 (e.g., k=3).

Furthermore, the cluster controller 166 tags clusters with a k identifier, where k corresponds to the cluster identifier number. For example, the first cluster is tagged with a "1," the second cluster is tagged with a "2," and the third cluster is tagged with a "3." In some examples, the cluster controller 166 utilizes any type of identifier to tag the containers in each cluster. The identifiers are identifiable by the priority generator 162. The cluster controller 166 provides the cluster identifiers to the priority generator 162.

In the illustrated example of FIG. 3, the priority monitoring information flow 300 includes the example priority generator 162 to generate the priority list 302. In operation, the example priority resource interface 168 obtains the clusters from the cluster generator 160 and selects one cluster to analyze. The container data controller 170 initializes a first container in the cluster to be analyzed. The resource interface 168 obtains the time-based utilization metrics of the container. For example, the resource interface 168 accesses the utilization metrics table 202 of FIG. 2. The example container data controller 170 initializes a resource in the time-based utilization metrics to be analyzed. For example, the container data controller 170 analyzes the first row 216 in the utilization metrics table 202. The example container data controller 170 determines the median utilization resource value for the resource of the container across the time interval. For example, the container data controller 170 utilizes Equation 1 above to determine the median utilization resource value. In some examples, the container data controller 170 determines if there is another resource in the time-based utilization metrics to be analyzed. For example, the container data controller 170 may analyze per row of data in the utilization metrics table 202, where each row corresponds to a different allocated resource usage type. Therefore, the example container data controller 170 accesses the next time-based utilization metrics until median utilization resource values are determined for each resource usage type allocated to the container.

In some examples, the container data controller 170 obtains the network interaction metrics, corresponding to the cluster. For example, the resource interface 168 obtains the network interaction metrics table 204. Additionally, the container data controller 170 utilizes Equation 2 above to determine the representative interaction count value of the container. For example, the container data controller 170 determines the number of interactions the container made with all other containers in the cluster during the time-interval.

The example container ranking generator 172 of the priority generator 162 determines the container priority ranking for the containers in the cluster. For example, the container ranking generator 172 first determines a number of resource usage types corresponding to the cluster (e.g., the cluster is indicative of equal numbers of resources allocated to the containers). In some examples, the container ranking generator 172 generates N number of resource lines, where N equals the number of resource usage types corresponding to the cluster.

The example container ranking generator 172 obtains the median utilization resource values and the representative interaction count values corresponding to the containers in the cluster. The example container ranking generator 172 determines a utilization ranking of the containers per resource usage type. For example, the container ranking generator 172 populates the resource lines with container identifiers. The container with the highest median utilization resource value for that resource and/or highest representative interaction count value is plotted on the rightmost side of the resource line.

In the illustrated example of FIG. 3, the priority monitoring information flow 300 includes a first resource line 304, a second resource line 306, and a third resource line 308 to illustrate utilization rankings of containers in a cluster. For example, the first resource line 304 corresponds to a first resource (e.g., vCPU), the second resource line 306 corresponds to a second resource (e.g., memory), and the third resource line 308 corresponds to a third resource (e.g., network IOPS).

In the illustrated example, the container ranking generator 172 determines that containerX includes the highest median resource utilization value for the first resource. Therefore, the container ranking generator 172 plots containerX as a highest utilization rank on the rightmost side of the first resource line 304. Additionally, the example container ranking generator 172 determines containerZ includes the lowest median resource utilization value for the first resource. Therefore, the container ranking generator 172 plots containerZ as a lowest utilization rank on the leftmost side of the first resource line 304. The container ranking generator 172 repeats the process of determining median resource utilization values for five containers (containerV, containerW, containerX, containerY, and containerZ) in the cluster until each resource line 304, 306, 308 is populated.

The example container ranking generator 172 determines a rank value for each container on each resource line 304,

306, 308. For example, the container ranking generator 172 determines a rank value for containerV, containerW, containerX, containerY, and containerZ for the first resource, the second resource, and the third resource. The rank value of a container is a percentage indicative that the container will include a higher utilization of that resource usage type than the other containers in the cluster. In some examples, the container ranking generator 172 utilizes Equation 3 below to determine the rank values. In Equation 3, r represents the resource usage type (e.g., first resource, second resource, third resource, etc.), i represents the container (e.g., containerV, containerW, containerX, containerY, or containerZ), $n(S_j)$ represents the number of containers with median resource utilization values and representative interaction count values less than the median resource utilization value and representative interaction count value of container i, and $n(C_j)$ represents the number of containers in the cluster.

$$\text{Resource Utilization Rank Value}_i^r = \frac{n(S_j)}{n(C_j)} \times 100 \quad \text{Equation 3}$$

In such an example, the rank value for containerX of the first resource is equal to 80 percent, because there are a total of five containers in the cluster and four of the containers include median resource utilization values and representative interaction count values less than the median resource utilization value and representative interaction count value of containerX.

In some examples, the container ranking generator 172 determines an aggregated resource utilization rank value for the containers in the cluster based on a sum of the rank values for the containers. For example, the container ranking generator 172 applies a weight to each rank value corresponding to the resource usage type and then determines the sum of weighted rank values for a container. In some examples, the container ranking generator 172 utilizes Equation 4 below to determine the aggregated resource utilization rank value of the containers. In Equation 4, N represents the number of resources allocated to the containers, r represents the resource usage type, $W_r$ represents the weight of r, and i represents the container. The $W_r$ value may be configured by the COM 144. In some examples, the $W_r$ value defaults to one, and each resource has an equal weight. In some examples, the container ranking generator 172 repeats Equation 4 until an aggregated resource utilization rank value has been determined for every container.

Aggregated Resource Utilization Rank Value =

$$\sum_{r=1}^{N} W_r \times \text{Rank Value}_i^r \quad \text{Equation 4}$$

The example container ranking generator 172 provides the aggregated resource utilization rank values to the container priority controller 174. The example container priority controller 174 generates the priority list 302 for the containers based on the aggregated resource utilization rank values. In the illustrated example of FIG. 3, the priority list 302 includes a QoS column. The QoS of a container can be determined by the container priority controller 174 based on the location (e.g., index) of the container in the priority list 302.

In some examples, the COM 144 may invoke a UI API to launch a GUI to display the priority list 302 to the user. The user may utilize the information displayed in the priority list 302 to perform actions. Such actions include assigning priority to a new container, developing a new container, adjusting the resources allocated to a container, updating the priority of containers, etc. In this manner, the priority generator 162 assists users in estimating the relative importance of containers with respect to other containers, provides recommended values of priority classes and QoS classes for the containers that can be acted upon, and assists users in maintaining the functionality of the important containers during resource crunch situations.

While an example manner of implementing the priority generation system 100 and/or, more generally, the virtual environment 106, is illustrated in FIG. 1, one or more of the elements, processes and/or devices illustrated in FIG. 1 may be combined, divided, re-arranged, omitted, eliminated and/or implemented in any other way. Further, the example VM agents 132, 134, 138, 140, the example network interactions controller 142, the example COM 144, the example RMP 146, the example resource monitor 147, the example data collection server 148, the example server interface 152, the example data processor 154, the example context correlator 156, the example cluster generator 160, the example priority generator 162, the example cluster interface 164, the example cluster controller 166, the example resource interface 168, the example container data controller 170, the example container ranking generator 172, the example container priority controller 174, and/or, more generally, the example priority generation system 100 of FIG. 1 may be implemented by hardware, software, firmware and/or any combination of hardware, software and/or firmware. Thus, for example, any of the example VM agents 132, 134, 138, 140, the example network interactions controller 142, the example COM 144, the example RMP 146, the example resource monitor 147, the example data collection server 148, the example server interface 152, the example data processor 154, the example context correlator 156, the example cluster generator 160, the example priority generator 162, the example cluster interface 164, the example cluster controller 166, the example resource interface 168, the example container data controller 170, the example container ranking generator 172, the example container priority controller 174, and/or, more generally, the example priority generation system 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example VM agents 132, 134, 138, 140, the example network interactions controller 142, the example COM 144, the example RMP 146, the example resource monitor 147, the example data collection server 148, the example server interface 152, the example data processor 154, the example context correlator 156, the example cluster generator 160, the example priority generator 162, the example cluster interface 164, the example cluster controller 166, the example resource interface 168, the example container data controller 170, the example container ranking generator 172, and/or the example container priority controller 174 is/are hereby expressly defined to include a non-transitory computer readable storage device or storage disk such as a memory, a digital versatile disk (DVD), a compact disk (CD), a Blu-ray disk, etc. including the software and/or firmware. Further still, the example priority generation system 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the priority generation system 100, the network interactions controller 142, and/or the resource monitor 147 of FIG. 1 is shown in FIGS. 4, 5, 6, 7, and 8. The machine readable instructions may be one or more executable programs or portion(s) of one or more executable programs for execution by a computer processor such as the processor 812 shown in the example processor platform 800 discussed below in connection with FIG. 9. The one or more programs may be embodied in software stored on a non-transitory computer readable storage medium such as a CD-ROM, a floppy disk, a hard drive, a DVD, a Blu-ray disk, or a memory associated with the processor 812, but the entirety of the program(s) and/or parts thereof could alternatively be executed by a device other than the processor 812 and/or embodied in firmware or dedicated hardware. Further, although the example program is described with reference to the flowchart illustrated in FIGS. 4, 5, 6A, 6B, and 7, many other methods of implementing the example priority generation system 100, the network interactions controller 142, and/or the resource monitor 147 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4, 5, 6A, 6B, and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 4:
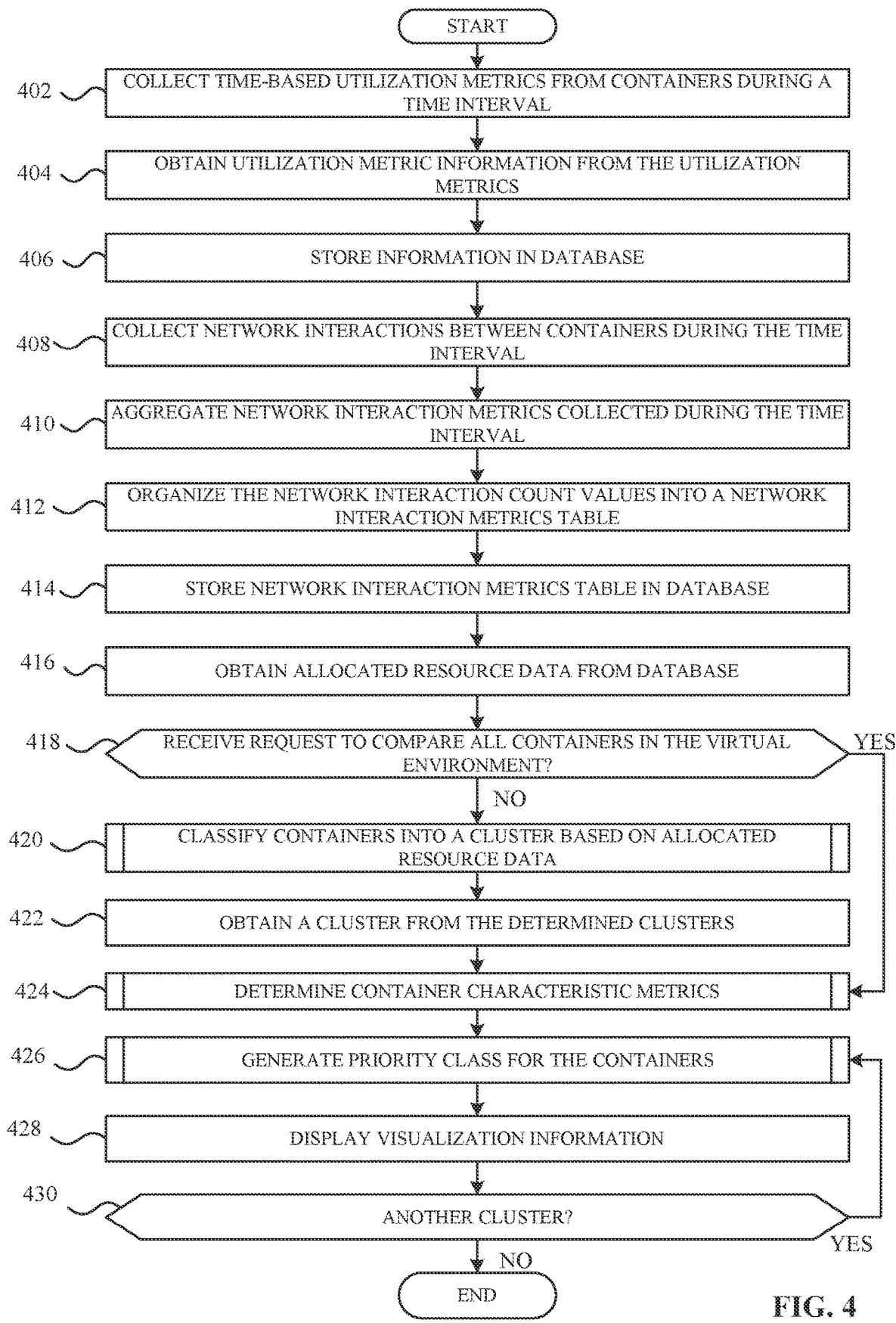
FIG. 4 is a flowchart representative of machine readable instructions which may be executed to implement the example priority generation system of FIG. 1 to determine priority classes for the example containers.

The program of FIG. 4 begins at block 402 at which the example server interface 152 (FIG. 1) collects time-based utilization metrics from the containers during a time interval. For example, the server interface 152 obtains the time-based utilization metrics from the resource monitor 147. The example data processor 154 (FIG. 1) obtains utilization metric information from the utilization metrics (block 404). For example, the data processor 154 extracts values associated with resource usage from the resource utilization metrics to be organized by the context correlator 156. The example context correlator 156 (FIG. 1) stores the utilization metrics in the database 158 (FIG. 1) (block 406).

The example server interface 152 (FIG. 1) collects network interactions between containers for the time interface (block 408). For example, the server interface 152 obtains container traffic messages from the network interactions controller 142 and the data processor 154 processes the container traffic messages by extracting data (e.g., metadata) from the container traffic messages and organizing the extracted data to be analyzed by the context correlator 156. The example context correlator 156 aggregates network interaction metrics collected during the time interval (block 410). For example, the context correlator 156 aggregates network interaction metrics into network interaction count values for each container 102a-d, 104a-d.

The example context correlator 156 organizes the network interaction count values into a network interaction metrics table (block 412). For example, the context correlator 156 organizes the network interaction metrics into the network interaction metrics table 204 of FIG. 2. The example context correlator 156 stores the network interaction metrics table in the database 158 (block 414).

The example cluster interface 164 (FIG. 1) obtains allocated resource data from the database 158 (block 416). In some examples, the context correlator 156 populates the database 158 with allocated resource data. The allocated resource data corresponds to the resources allocated to the pods 128a-d, 130a-d in which the containers 102a-d, 104a-d are deployed.

The example generator 160 (FIG. 1) determines whether a request to compare all containers 102a-d, 104a-d in the virtual environment 106 has been received (block 418). For example, the cluster generator 160 may receive such a request from the COM 144 (FIG. 1). If the example cluster generator 160 determines a request to compare all containers 102a-d, 104a-d in the virtual environment 106 has been received (e.g., block 418 returns a value of YES), the priority generator 162 determines container characteristic metrics (block 424). For example, the container data controller 170 (FIG. 1) performs an analysis of the containers based on the utilization metrics and the network interaction metrics corresponding to the containers. Further example instructions that may be used to implement block 418 are described below in connection with FIG. 7 when the cluster generator 160 receives a request to compare all containers 102a-d, 104a-d in the virtual environment 106.

If the example cluster generator 160 determines a request to compare all containers 102a-d, 104a-d in the virtual environment 106 has not been received (e.g., block 418 returns a value of NO), the example cluster controller 166 (FIG. 1) classifies containers into a cluster based on the allocated resource data (block 420). For example, the cluster controller 166 utilizes the allocated resource data from the cluster interface 164 to determine similar ones of containers in the virtual environment 106. Further example instructions that may be used to implement block 420 are described below in connection with FIG. 5.

The example resource interface 168 (FIG. 1) obtains a cluster from the determined clusters from the cluster controller 166 (block 422). For example, cluster controller 166 notifies the resource interface 168 that clusters are available. In other examples, the resource interface 168 periodically or aperiodically queries the cluster controller 166 for new clusters. In the illustrated example, the resource interface 168 obtains one cluster because the priority generator 162 analyzes one cluster of containers at a time.

The example priority generator 162 (FIG. 1) determines container characteristic metrics of containers (block 424) for the containers in the cluster. For example, the container data controller 170 (FIG. 1) performs an analysis of the containers based on the utilization metrics and the network interaction metrics corresponding to the containers. In some examples, the container characteristic metrics may be determined at block 424 by the container data controller 170 using an intra-cluster container characteristic generation program as described below in connection with FIG. 6. In other examples, the container characteristic metrics may be determined at block 424 by the container data controller 170 using an inter-cluster container characteristic generation program as described below in connection with FIG. 7.

The example priority generator 162 (FIG. 1) generates a priority class for the containers (block 426). For example, the container ranking generator 172 (FIG. 1) and the container priority controller 174 (FIG. 1) perform a ranking analysis of the containers based on the characteristic metrics corresponding to the containers. Further example instructions that may be used to implement block 426 are described below in connection with FIG. 8. The example COM 144 displays visualization information (block 428). For example, the priority generator 162 provides the priority class to the COM 144, and the COM 144 may invoke a UI API to display the priority class via a GUI to the users.

The example resource interface 168 may determine if another cluster is available to be analyzed (block 430). For example, the resource interface 168 may be notified when the container priority controller 174 completes the priority list. In some examples, the resource interface 168 determines there is another cluster available to be analyzed (e.g., block 430 returns a value of YES), and control returns to block 426. In other examples, the resource interface 168 determines there is not another cluster available to be analyzed (e.g., block 430 returns a value of NO), and the program of FIG. 4 ends. For example, if at block 418 the cluster generator 160 determines a request to compare all containers in the virtual environment 106 was received, there will not be another cluster to analyze.

The program of FIG. 4 may be repeated when the priority generation system 100 is initialized and new metrics are obtained by the data collection server 148.

Figure 5:
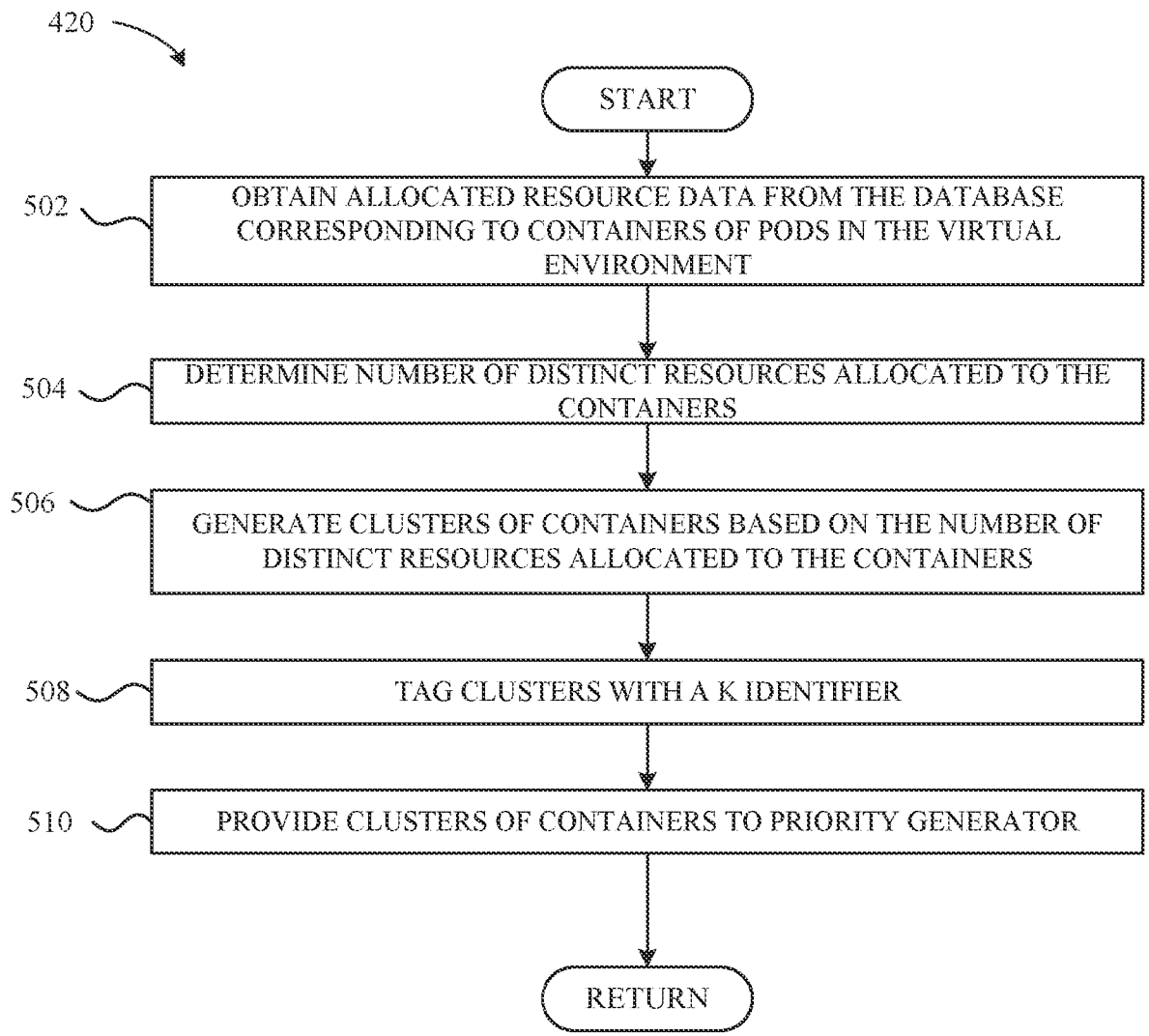
FIG. 5 is a flowchart representative of machine readable instructions which may be executed to implement an example cluster generator of FIG. 1 to generate clusters of the example containers.

Turning to FIG. 5, the example cluster generation program 420 begins when the cluster interface 164 (FIG. 1) obtains allocated resource data from the database 158 (FIG. 1) corresponding to containers 102a-d, 104a-d (FIG. 1) of the pods 128a-d, 130a-d (FIG. 1) in the virtual environment 106 (block 502). For example, the cluster interface 164 may access the allocated resources table 200 of FIG. 2 to obtain the allocated resource data.

The example cluster controller 166 (FIG. 1) determines a number of distinct resources allocated to the containers 102a-d, 104a-d (block 504). For example, the cluster controller 166 determines that the pods 128a-c are allocated eight different resources. Therefore, the cluster controller 166 determines the containers 102a-c are allocated eight resources. The example cluster controller 166 generates clusters of containers based on the number of distinct resources allocated to the containers (block 506). For example, the cluster controller 166 performs an N-dimensional k-means clustering algorithm to determine groups the containers based on a threshold number of fewer or more resources than N allocated resources.

The example cluster controller 166 tags the clusters with a k identifier (block 508), where k corresponds to the cluster number. For example, if the first containers 102a include similar allocated resources as the second containers 102b, the first containers 102a and the second containers 102b may be grouped into a first cluster and tagged with a k cluster identifier number 1.

The example cluster controller 166 provides the clusters to the priority generator 162 of FIG. 1 (block 510). For example, the cluster controller 166 provides the clusters to the resource interface 168 (FIG. 1) for priority generation. The cluster generation program 418 of FIG. 5 returns to the program of FIG. 4 when the resource interface 168 obtains the clusters. The cluster generation program 418 of FIG. 5 may be repeated when new containers and/or pods are deployed, modified, removed, etc., in the virtual environment 106.

Figure 6:
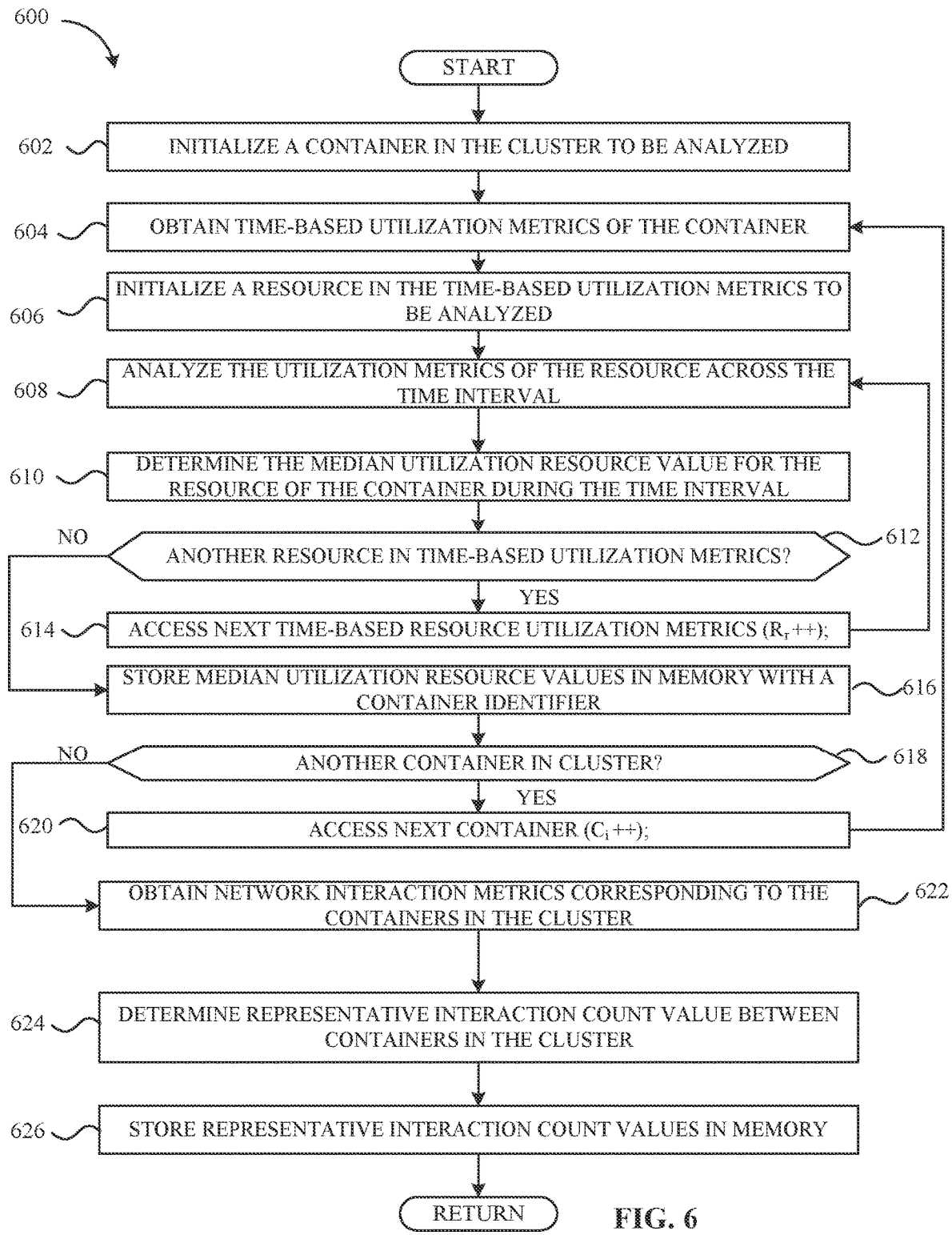
FIG. 6 is a flowchart representative of example machine readable instructions which may be executed to implement an example priority generator of FIG. 1 to determine characteristic metrics of containers in the clusters.

FIG. 6 illustrates an example intra-cluster container characteristic generation program 600 to generate the characteristic metrics of the containers in a cluster. The example machine readable instructions 600 may be used to implement block 424 of FIG. 4 by determining container characteristic metrics of individual clusters generated by the example cluster controller 166 of FIG. 1. In FIG. 6, the example intra-cluster container characteristic generation program 600 begins at block 602 at which the example resource interface 168 (FIG. 1) initializes a container in the cluster to be analyzed. For example, the resource interface 168 obtains the clusters from the cluster generator 160 (FIG. 1) and selects one cluster to analyze.

The example resource interface 168 obtains the time-based utilization metrics of the container (block 604). For example, the resource interface 168 obtains the utilization metrics table 202 of FIG. 2. The example container data controller 170 (FIG. 1) initializes a resource in the time-based utilization metrics to be analyzed (block 606). For example, the container data controller 170 analyzes the first row 216 in the utilization metrics table 202.

The example container data controller 170 analyzes the utilization metrics of the resource across the time interval (block 608). The example container data controller 170 determines the median utilization resource value for the resource of the container during the time interval (block 610). For example, the container data controller 170 utilizes Equation 1 above to determine the median utilization resource value. The example container data controller 170 determines if there is another resource in the time-based utilization metrics to be analyzed (block 612). For example, the container data controller 170 may analyze per row of data in the utilization metrics table 202, where each row corresponds to a different allocated resource usage type. When the example container data controller 170 determines there is another resource (e.g., block 612 returns a value of YES), the container data controller 170 accesses the next time-based resource utilization metrics (block 614), and control returns to block 608. When example the container data controller 170 determines there is not another resource (e.g., block 612 returns a value of NO), the container data controller 170 stores the median utilization resource values in memory with a container identifier (block 616).

The example container data controller 170 determines if there is another container in the cluster available to be analyzed (block 618). If the example container data controller 170 determines there is another cluster (e.g., block 618 returns a value YES), the container data controller 170 accesses the next container in the cluster (block 620), and control returns to block 604.

When the example container data controller 170 determines there is not another container in the cluster (e.g., block 618 returns a value NO), the container data controller 170 obtains the network interaction metrics corresponding to the containers in the cluster (block 622). For example, the resource interface 168 accesses the network interaction metrics table 204 to obtain the network interaction metrics and passes the network interaction metrics to the container data controller 170. The example container data controller 170 determines the representative interaction count value between containers in the cluster (block 624). At block 624, the representative interaction count value corresponds to a total number of network interactions for a container with all other containers in the cluster. For example, the container data controller 170 utilizes Equation 2 above to determine the representative interaction count value of the container. For example, the container data controller 170 determines the number of interactions the container made with all other containers in the cluster during the time interval. The example container data controller 170 stores the representative interaction count values in memory (block 626). In the illustrated example, after the container data controller 170 stores the representative interaction count values of the containers in memory at block 626, the example intra-cluster container characteristic generation program 600 ends, and control returns to the program of FIG. 4.

Figure 7:
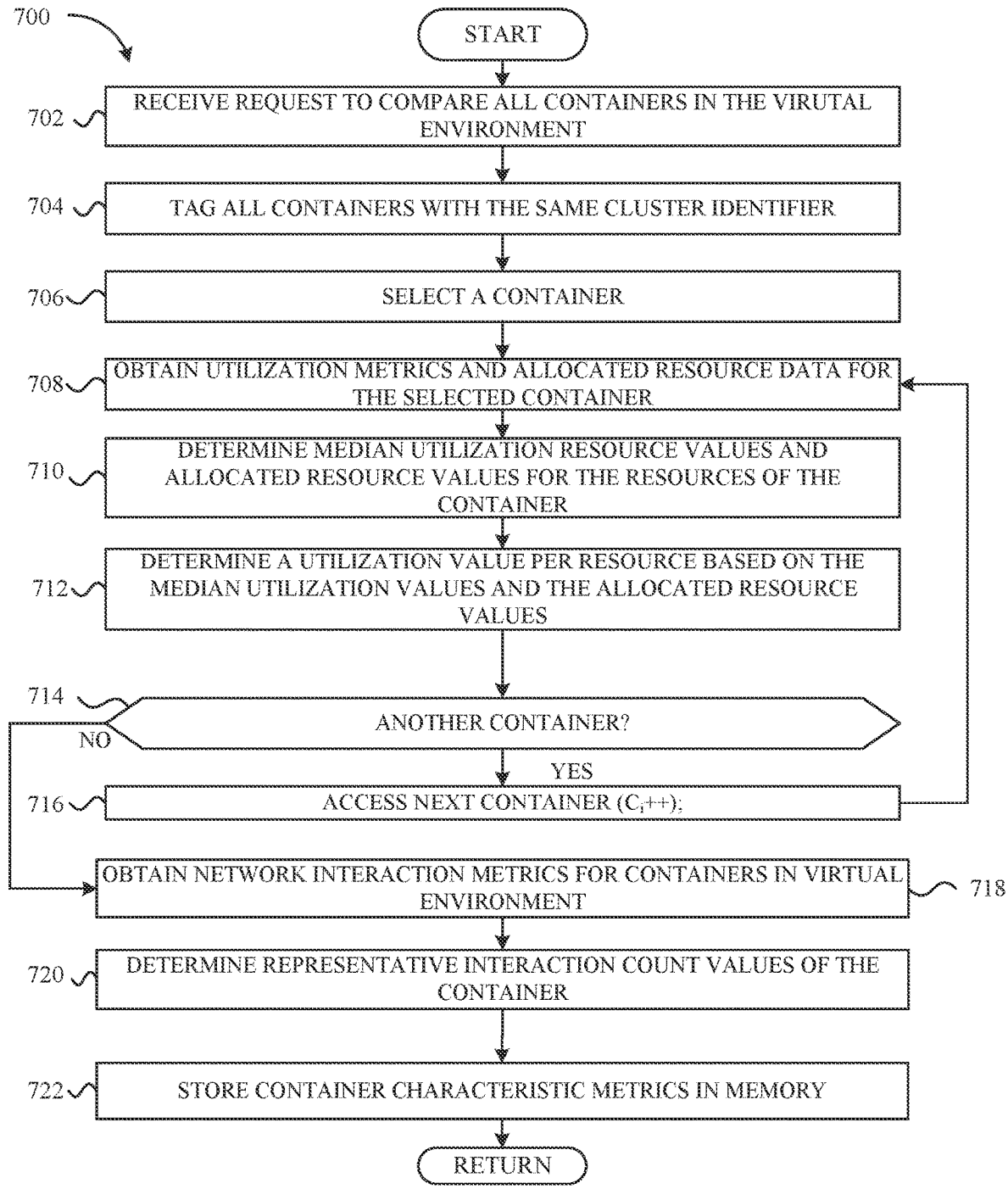
FIG. 7 is a flowchart representative of example machine readable instructions which may be executed to implement an example priority generator of FIG. 1 to determine characteristic metrics of the example containers in the example virtual environment of FIG. 1.

Turning to FIG. 7, alternative example machine readable instructions that may be used to implement block 424 of FIG. 4 to determine characteristic metrics of containers across different clusters are represented as an inter-cluster container characteristic generation program 700. For example, the inter-cluster container characteristic generation program 700 does not treat the containers 102a-d, 104a-d on the basis of being in separate clusters. That is, the inter-cluster container characteristic generation program 700 determines characteristic metrics for the containers 102a-c without regard to their cluster assignments such that a container is prioritized relative to another container though the containers may be assigned to different clusters. The example inter-cluster container characteristic generation program 700 begins at block 702 at which the priority generation system 100 (FIG. 1) receives a request to compare all containers in the virtual environment 106 (FIG. 1). For example, the cluster generator 160 (FIG. 1) may receive the instructions from the COM 144 (FIG. 1).

The example cluster generator 160 tags all containers with the same cluster identifier (block 704). For example, the cluster controller 166 (FIG. 1) assigns an equal k-identifier to containers 102*a*-*d*, 104*a*-*d*. The example resource interface 168 (FIG. 1) selects a container to be analyzed (block 706). For example, the cluster controller 166 provides containers with equal cluster identifiers to the resource interface 168.

The example resource interface 168 obtains utilization metrics and allocated resource data for the selected container (block 708). For example, the resource interface 168 obtains such information from the database 158 (FIG. 1). The example container data controller 170 (FIG. 1) determines the median utilization resource values and allocated resource values for the resources of the container (block 710). For example, the container data controller 170 utilizes Equation 1 to determine the median utilization resource value for the container.

The example container data controller 170 determines a utilization value per resource based on the median utilization resource value and the allocated resource value (block 712). For example, the container data controller 170 may utilize Equation 5 below to determine the utilization value. In Equation 5, $x_i^r$ represents the median utilization resource value for a resource (r) of container i, and y represents the allocated resource value of the container. In Equation 5, the utilization value uses the allocated resource value y of the container because allocated resources capture the importance of the container that the application developer desires. For example, if a developer is assigning high resource values to a pod, even if the actual utilization of the resources by the pod are low, the assignment may be indicative that the pod application is critical and/or important to the developer. Therefore, assigning a high resource value to a pod ensures that the pod is not bothered in case of resource crunch situations.

$$\text{Utilization Value}_i = \frac{x_i^r}{y_i^r} \quad \text{Equation 5}$$

The example container data controller 170 determines if there is another container to be analyzed (block 714). When the example container data controller 170 determines there is another container (e.g., block 714 returns a value of YES), the container data controller 170 accesses the next container from the resource interface 168 (block 716), and control returns to block 708. When the example container data controller 170 determines there is not another container to be analyzed (e.g., block 714 returns a value of NO), the container data controller 170 obtains the network interaction metrics for containers in the virtual environment 106 (block 718). For example, the container data controller 170 accesses the network interaction metrics table 204 from the database 158 to obtain the network interaction metrics.

The example container data controller 170 determines a representative interaction count value of the container based on network interaction metrics (block 720). For example, the representative interaction count value is indicative of interactions between the container and all other containers in the virtual environment 106. For example, the container data controller 170 may utilize Equation 2 above to determine the representative interaction count value of the container.

The example container data controller 170 stores container characteristic metrics in memory (block 722). For example, the container data controller 170 stores the utilization values and representative interaction count values of the containers in memory. The container characteristic metrics (e.g., the utilization values and representative interaction count values) may be accessed by the container ranking generator 172 (FIG. 1) for priority generation. In the illustrated example, after the container data controller 170 stores the utilization values and representative interaction count values of the containers in memory at block 722, the example inter-cluster container characteristic generation program 700 ends, and control returns to the program of FIG. 4.

Figure 8:
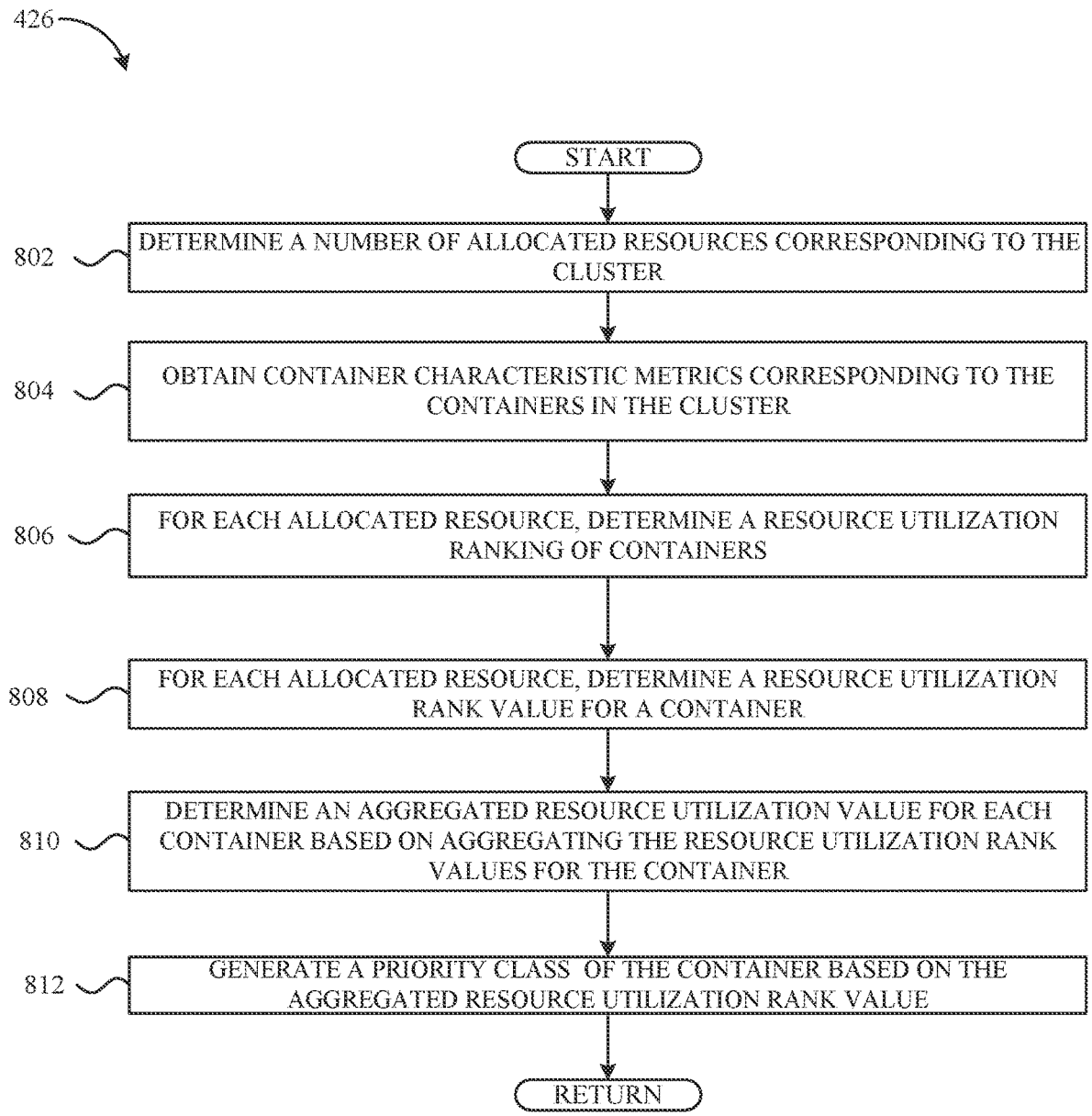
FIG. 8 is a flowchart representative of machine readable instructions which may be executed to implement the example priority generator of FIG. 1 to generate a priority of the example containers across the example virtual environment.

FIG. 8 illustrates an example priority generation program 426 to generate priority classes for the containers. The example priority generation program 426 of FIG. 8 begins at block 802 at which the example container ranking generator 172 (FIG. 1) determines the number of allocated resources corresponding to a cluster (e.g., the cluster is indicative of equal numbers of resources allocated to the containers). In some examples, the container ranking generator 172 utilizes the N value determined by the cluster controller 166 (FIG. 1). In other examples, the container ranking generator 172 determines the number of allocated resources corresponding to containers across the virtual environment 106 that include the same cluster identifier.

The example container ranking generator 172 obtains the container characteristic metrics corresponding to the containers in the cluster (block 804). For example, the container ranking generator 172 obtains the median resource utilization values or the utilization values and the representative interaction count values from the container data controller 170. The example container ranking generator 172 determines a resource utilization ranking of the containers for each allocated resource (block 806). For example, the container that includes the lowest utilization metrics for that resource is located at a lowest utilization rank (e.g., the leftmost side of a horizontal line or the bottom of a vertical line) and the container that includes the highest utilization metric for that resource is located at a highest utilization rank (e.g., the rightmost side of the horizontal line or the top of the vertical line). For example, the container ranking generator 172 populates container identifiers on resource lines such as the resource lines 304, 306, and 308 described above in connection with FIG. 3. The container with the highest median resource utilization value for that resource and/or highest representative interaction count value is plotted on the rightmost side of the resource line.

The example container ranking generator 172 determines a resource utilization rank value for the containers in the cluster (block 808). For example, the resource utilization rank value is indicative that the container will include a higher utilization of that resource usage type than the other containers in the cluster. For example, the container ranking generator 172 utilizes Equation 3 above to determine the resource utilization rank values of the containers per resource.

The example container ranking generator 172 determines aggregated resource utilization values for the containers based on aggregating the resource utilization rank values for that container (block 810). For example, the container ranking generator 172 applies a weight to each rank value corresponding to the resource usage type and then determines the sum of weighted resource utilization rank values for a container.

When an aggregated resource utilization rank value has been determined for each container in the cluster, the example container priority controller 174 generates a priority class of the containers based on the aggregated resource utilization value (block 812). For example, the container priority controller 174 assigns a priority class to each container that is equal to the index of the container. For example, the container priority controller 174 may return the position of the container in the priority list as an index value (e.g., index0, index1, index2, index3, etc.) and assign the priority class as equal to the index of the container.

The priority generation program 426 of FIG. 8 ends, and control returns to the program of FIG. 4 after the container priority controller 174 generates the priority list. In some examples, the priority generation program 426 of FIG. 8 may be repeated when the cluster controller 166 (FIG. 1) provides new containers to the priority generator 162 (FIG. 1).

Figure 9:
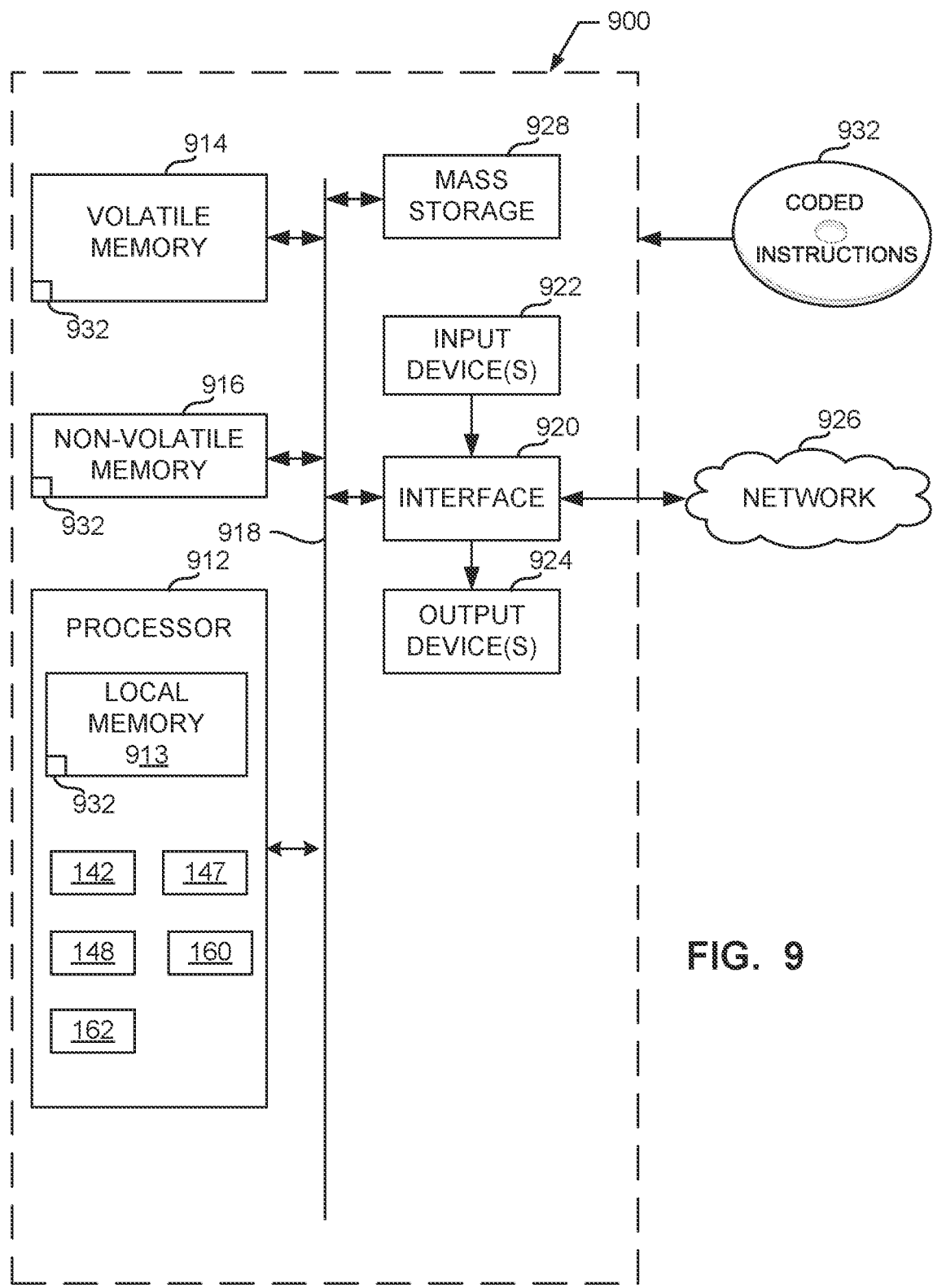
FIG. 9 is a block diagram of an example processing platform structured to execute the instructions of FIGS. 4, 5, 6, 7, and 8 to implement the example priority generation system of FIG. 1.

FIG. 9 is a block diagram of an example processor platform 800 structured to execute the instructions of FIGS. 4, 5, 6, 7, and 8 to implement the priority generation system 100 of FIG. 1. The processor platform 800 can be, for example, a server, a personal computer, a workstation, a self-learning machine (e.g., a neural network), a mobile device (e.g., a cell phone, a smart phone, a tablet such as an iPad™), an Internet appliance, or any other type of computing device. Additionally and/or alternatively, the processor platform 900 may implement a hypervisor.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network interactions controller 142, the example resource monitor 147, the example data collection server 148, the example cluster generator 160, and the example priority generator 162.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), and/or a tactile output device. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

Machine executable instructions 932 represented in FIGS. 4, 5, 6, 7, and 8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that generate the priority for containers in a virtual environment by determining clusters of containers based on allocated resources and analyzing the containers on a cluster-by-cluster basis. The disclosed methods, apparatus and articles of manufacture improve the efficiency of using a computing device by providing users the ability to promptly and efficiently determine ones of the containers in the virtual environment to be maintained during resource minimization, thus optimizing the efficiency of the applications. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system comprising:
   memory;
   programmable circuitry; and
   machine readable instructions to program the programmable circuitry to:
   obtain utilization metric information corresponding to utilization metrics collected over a time interval, the utilization metrics corresponding to allocated resources utilized by containers, the containers associated with a cluster;

obtain a request to generate priority classes for the containers in the cluster, the priority classes indicative of which containers have a greater priority in the cluster; and generate the priority classes for the containers based on the utilization metric information and a count of network interactions corresponding to the containers for the time interval.

2. The system of claim 1, wherein the programmable circuitry is to cause an interface to display visualization information corresponding to the priority classes.

3. The system of claim 1, wherein the programmable circuitry is to classify the containers into the cluster based on the allocated resources.

4. The system of claim 1, wherein the programmable circuitry is to:

aggregate the network interactions for ones of the containers; and determine the count of the network interactions based on the aggregate network interactions for the ones of the containers.

5. The system of claim 1, wherein the programmable circuitry is to:

determine median utilization resource values for the allocated resources utilized by the containers in the cluster based on the utilization metric information, the median utilization resource values indicative of median usages of resources by the containers; and generate the priority classes based on the median utilization resource values and the count of network interactions.

6. The system of claim 1, wherein the priority classes are first priority classes, the containers are first containers, the cluster is a first cluster, the utilization metric information is first utilization metric information, the utilization metrics are first utilization metrics, and the count of the network interactions is a first count of first network interactions, the programmable circuitry to:

obtain a request to generate second priority classes for the first containers in the first cluster and second containers in a second cluster;

obtain second utilization metric information corresponding to second utilization metrics collected over the time interval; and determine a second count of second network interactions corresponding to the second containers for the time interval.

7. The system of claim 6, wherein the programmable circuitry is to generate the second priority classes based on the first utilization metric information, the second utilization metrics information, the first count of the first network interactions, and the second count of the second network interactions, the second priority classes indicative of which of the first containers and the second containers have the greater priority in first and second clusters.

8. A non-transitory machine readable storage medium comprising instructions to cause programmable circuitry to at least:

obtain utilization metric information corresponding to utilization metrics collected over a time interval, the utilization metrics corresponding to allocated resources utilized by containers, the containers associated with a cluster;

obtain a request to generate priority classes for the containers in the cluster, the priority classes indicative of which containers have a greater priority in the cluster; and generate the priority classes for the containers based on the utilization metric information and a count of network interactions corresponding to the containers for the time interval.

9. The non-transitory computer readable storage medium as defined in claim 8, wherein the instructions are to cause the programmable circuitry to cause an interface to display visualization information corresponding to the priority classes.

10. The non-transitory computer readable storage medium as defined in claim 8, wherein the instructions are to cause the programmable circuitry to classify the containers into the cluster based on the allocated resources.

11. The non-transitory computer readable storage medium as defined in claim 8, wherein the instructions are to cause the programmable circuitry to:

aggregate the network interactions for ones of the containers; and determine the count of the network interactions based on the aggregate network interactions for the ones of the containers.

12. The non-transitory computer readable storage medium as defined in claim 8, wherein the instructions are to cause the programmable circuitry to:

determine median utilization resource values for the allocated resources utilized by the containers in the cluster based on the utilization metric information, the median utilization resource values indicative of median usages of resources by the containers; and generate the priority classes based on the median utilization resource values and the count of network interactions.

13. The non-transitory computer readable storage medium as defined in claim 8, wherein the priority classes are first priority classes, the containers are first containers, the cluster is a first cluster, the utilization metric information is first utilization metric information, the utilization metrics are first utilization metrics, and the count of the network interactions is a first count of first network interactions, the instructions to cause the programmable circuitry to:

obtain a request to generate second priority classes for the first containers in the first cluster and second containers in a second cluster;

obtain second utilization metric information corresponding to second utilization metrics collected over the time interval; and determine a second count of second network interactions corresponding to the second containers for the time interval.

14. The non-transitory computer readable storage medium as defined in claim 13, wherein the instructions are to cause the programmable circuitry to generate the second priority classes based on the first utilization metric information, the second utilization metrics information, the first count of the first network interactions, and the second count of the second network interactions, the second priority classes indicative of which of the first containers and the second containers have the greater priority in first and second clusters.

15. A method comprising:

obtaining, by executing an instruction with programmable circuitry, utilization metric information corresponding to utilization metrics collected over a time interval, the utilization metrics corresponding to allocated resources utilized by containers, the containers associated with a cluster;

obtaining, by executing an instruction with the programmable circuitry, a request to generate priority classes for the containers in the cluster, the priority classes indicative of which containers have a greater priority in the cluster; and generating, by executing an instruction with the programmable circuitry, the priority classes for the containers based on the utilization metric information and a count of network interactions corresponding to the containers for the time interval.

16. The method of claim 15, further including causing an interface to display visualization information corresponding to the priority classes.

17. The method of claim 15, further including classifying the containers into the cluster based on the allocated resources.

18. The method of claim 15, further including:
aggregating the network interactions for ones of the containers; and
determining the count of the network interactions based on the aggregate network interactions for the ones of the containers.

19. The method of claim 15, further including:
determining median utilization resource values for the allocated resources utilized by the containers in the cluster based on the utilization metric information, the median utilization resource values indicative of median usages of resources by the containers;
generating the priority classes based on the median utilization resource values and the count of network interactions.

20. The method of claim 15, wherein the priority classes are first priority classes, the containers are first containers, the cluster is a first cluster, the utilization metric information is first utilization metric information, the utilization metrics are first utilization metrics, and the count of the network interactions is a first count of first network interactions, further including:
obtaining a request to generate second priority classes for the first containers in the first cluster and second containers in a second cluster;
obtaining second utilization metric information corresponding to second utilization metrics collected over the time interval;
determining a second count of second network interactions corresponding to the second containers for the time interval; and
generating the second priority classes based on the first utilization metric information, the second utilization metrics information, the first count of the first network interactions, and the second count of the second network interactions, the second priority classes indicative of which of the first containers and the second containers have the greater priority in first and second clusters.

* * * * *